United States Patent [19]

Crutchley et al.

[11] Patent Number: 4,981,823

[45] Date of Patent: Jan. 1, 1991

[54] BERYLLIUM OXIDE BASED CERAMICS

[75] Inventors: Michael Crutchley, Dyfed, Wales; Ronald Stevens, Leeds, Great Britain

[73] Assignee: CBL Ceramics Limited, England

[21] Appl. No.: 281,919

[22] Filed: Dec. 7, 1988

Related U.S. Application Data

[63] Continuation of Ser. No. 94,725, filed as PCT GB86/00713 on Nov. 21, 1986, published as WO87/03277 on Jun. 4, 1987, abandoned.

[30] Foreign Application Priority Data

| Nov. 27, 1985 | [GB] | United Kingdom | 8529149 |
| Nov. 27, 1985 | [GB] | United Kingdom | 8529150 |
| Nov. 27, 1985 | [GB] | United Kingdom | 8529151 |
| Nov. 27, 1985 | [GB] | United Kingdom | 8529152 |
| Nov. 27, 1985 | [GB] | United Kingdom | 8529153 |

[51] Int. Cl.$^5$ .............................................. C04B 35/08
[52] U.S. Cl. ........................................ 501/123; 501/1; 501/94; 501/102; 501/108; 501/126; 501/152
[58] Field of Search ............... 501/1, 94, 102, 108, 501/126, 152, 123

[56] References Cited

U.S. PATENT DOCUMENTS

| 1,879,589 | 8/1932 | Tama | 501/94 |
| 2,098,812 | 11/1937 | Pulfrich | 501/134 |
| 2,564,859 | 4/1951 | Rogers | 501/153 |
| 2,749,246 | 2/1956 | Schurecht | 501/135 |
| 3,025,137 | 3/1962 | Murray et al. | 423/624 |
| 3,165,417 | 9/1965 | Turner | 501/94 |
| 3,196,023 | 5/1965 | Theodore et al. | 501/94 |
| 3,278,454 | 10/1966 | Turner et al. | 501/1 |
| 3,301,689 | 12/1967 | Theodore et al. | 501/94 |
| 3,344,080 | 1/1967 | Livey | 501/94 |
| 3,564,086 | 11/1971 | Nishigaki et al. | 501/93 |
| 4,007,049 | 2/1977 | Rossi et al. | 501/96 |

FOREIGN PATENT DOCUMENTS

| 404285 | 7/1966 | Australia . |
| 1105786 | 2/1961 | Fed. Rep. of Germany . |
| 1176044 | 9/1964 | Fed. Rep. of Germany . |
| 1233313 | 6/1967 | Fed. Rep. of Germany . |
| 1930486 | 2/1970 | Fed. Rep. of Germany . |
| 1400891 | 9/1965 | France . |
| 1428860 | 1/1966 | France . |
| 1524723 | 6/1968 | France . |
| 1552389 | 8/1969 | France . |
| 665373 | 8/1952 | United Kingdom . |
| 956911 | 7/1964 | United Kingdom . |
| 993745 | 3/1965 | United Kingdom . |
| 1209780 | 1/1970 | United Kingdom . |

OTHER PUBLICATIONS

P. 1249 of Webster's *Ninth New Collegiate Dictionary*, (1987).
Scholes, W. A., *J. Am. Chem. Soc.*, 33:111–117, (1950).
Duderstadt and White, *Ceramic Bulletin* 44(11):907–911, (1965).
Walsh, *27th Electronic Components Conference*, pp. 404–407, (1977).
Ko, C-K., et al, *Chem. Abstr.* 95:104012h, (1981).
Hitachi, Ltd., *Chem. Abstr.* 96:191690p, (1982).

*Primary Examiner*—William R. Dixon, Jr.
*Assistant Examiner*—Anthony J. Green
*Attorney, Agent, or Firm*—Saidman, Sterne, Kessler & Goldstein

[57] ABSTRACT

A ceramic article made from a mixture comprising (on a dry weight basis) magnesium oxide (MgO) in an amount up to 2% by weight, a defined rare earth oxide in amount up to 10% by weight, balance beryllium oxide, and trace elements, the defined rare earth oxide being zirconium oxide ($ZrO_2$), hafnium oxide ($HfO_2$), cerium oxide ($Ce_2O_3$), yttrium oxide ($Y_2O_3$), ytterbium oxide ($Yb_2O_3$) or thorium oxide ($ThO_2$). Such ceramic articles have much improved properties in particular higher densities than attainable hitherto and better crossbreak strength and surface smoothness as fired. The ceramic compositions can also be admixed with supplementary ceramic materials such as silicon carbide to produce microwave absorbing materials.

7 Claims, 27 Drawing Sheets

×400

×400

×400

×400

4 MICRONS

4 MICRONS

4 MICRONS

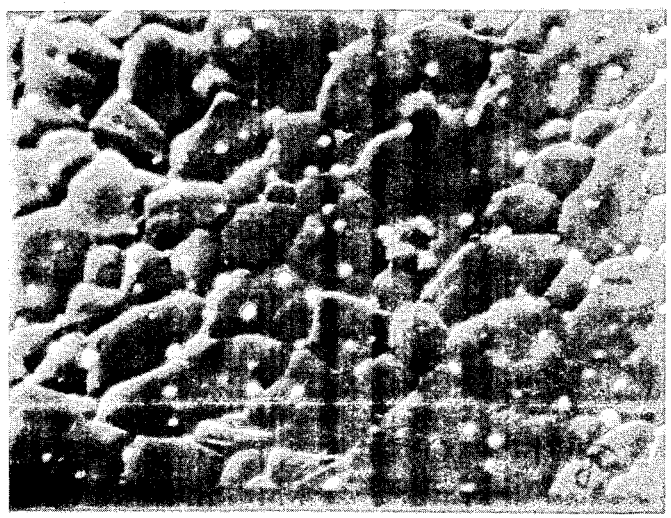
20 MICRONS  FIG. 10.
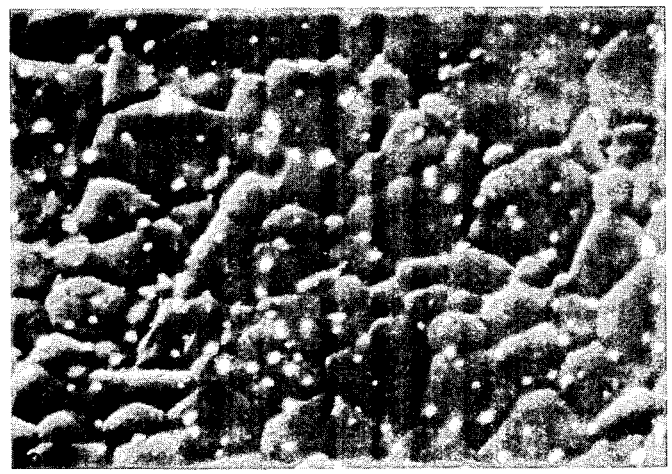
20 MICRONS  FIG. 11.

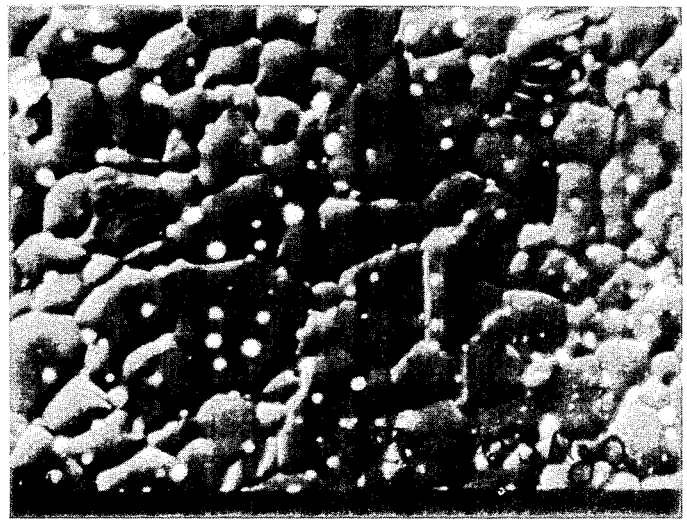
20 MICRONS  FIG.12.
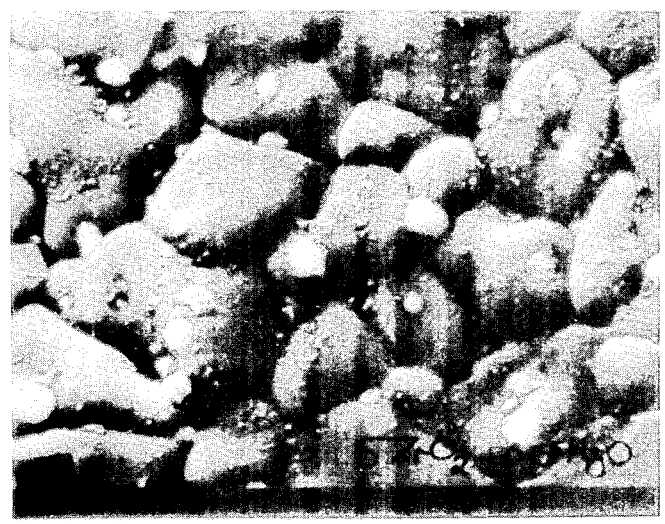
10 MICRONS  FIG.13.

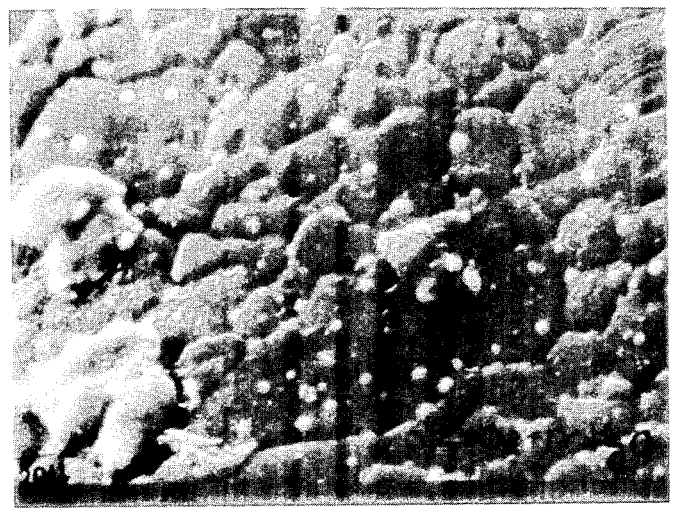
20 MICRONS  FIG.14.
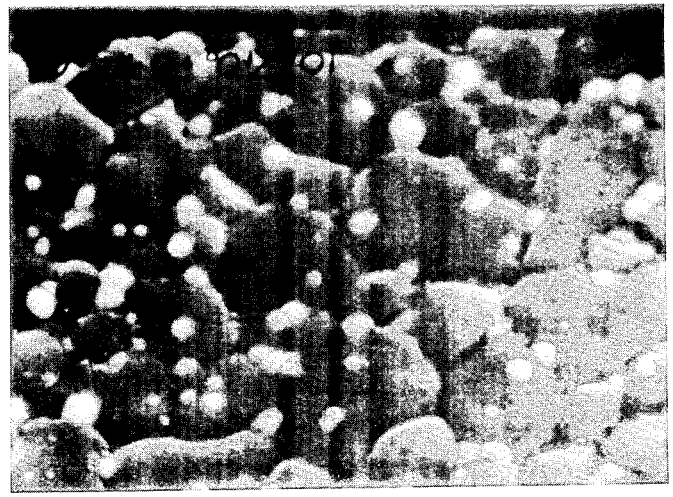
10 MICRONS  FIG.15.

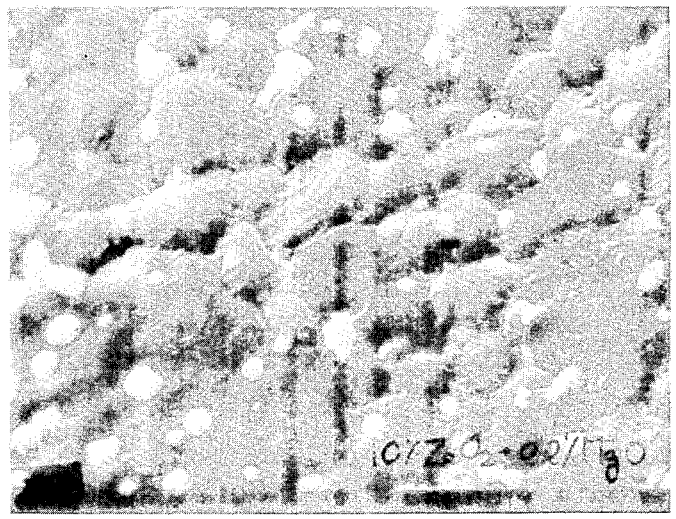
10 MICRONS   FIG. 16.
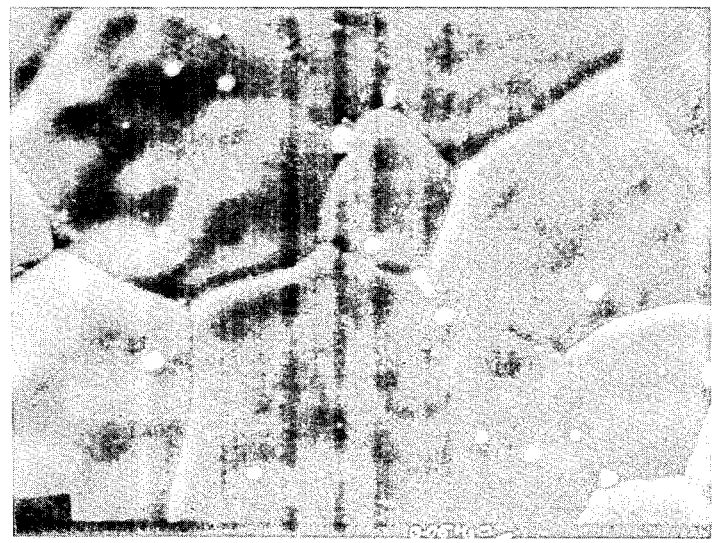
20 MICRONS   FIG. 17.

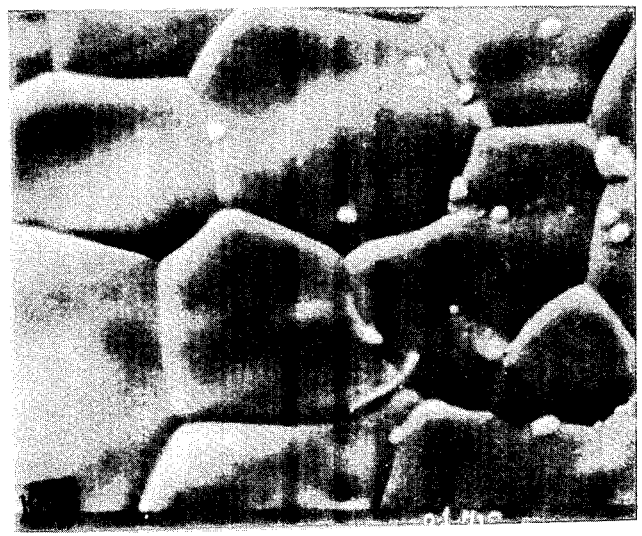
10 MICRONS    FIG.18.
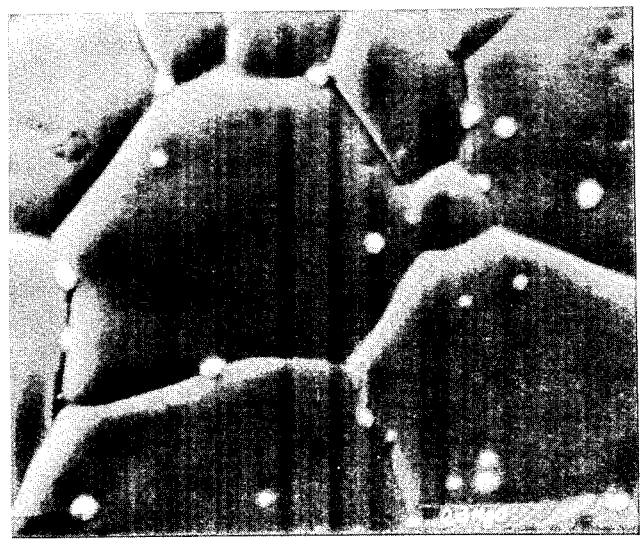
10 MICRONS    FIG.19.

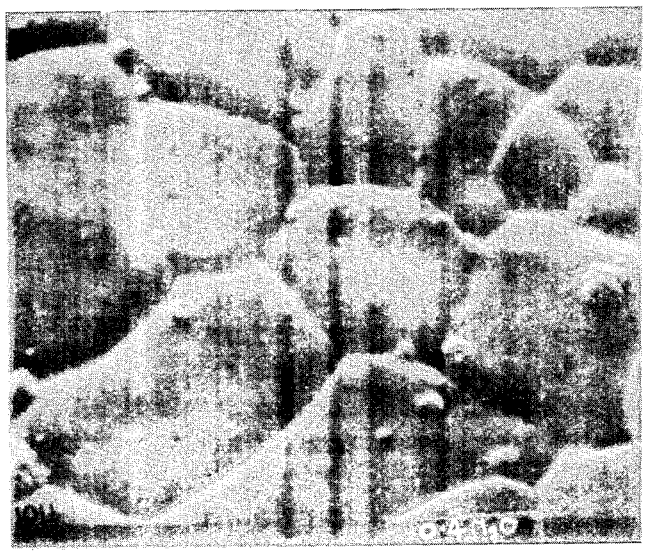
10 MICRONS  FIG.20.
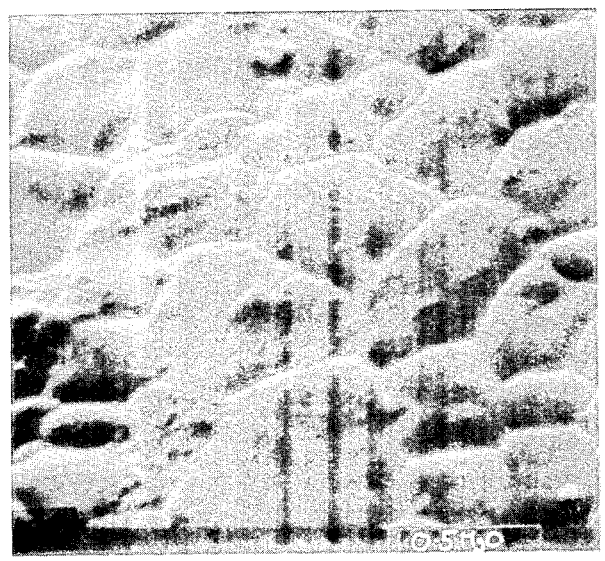
10 MICRONS  FIG.21.

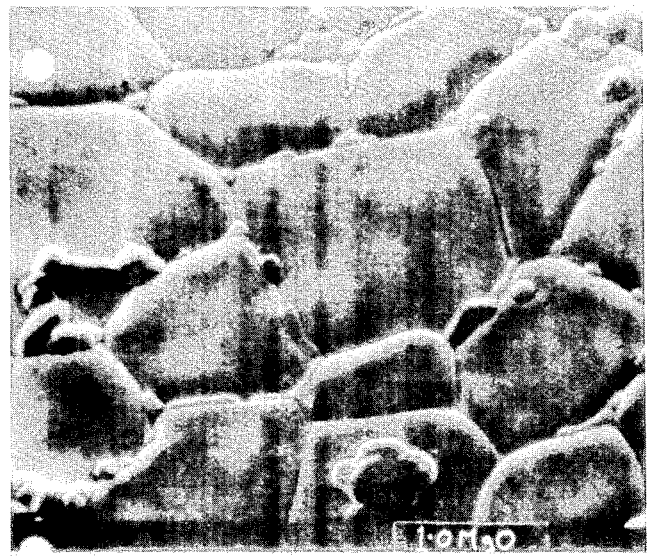
10 MICRONS  FIG.22.
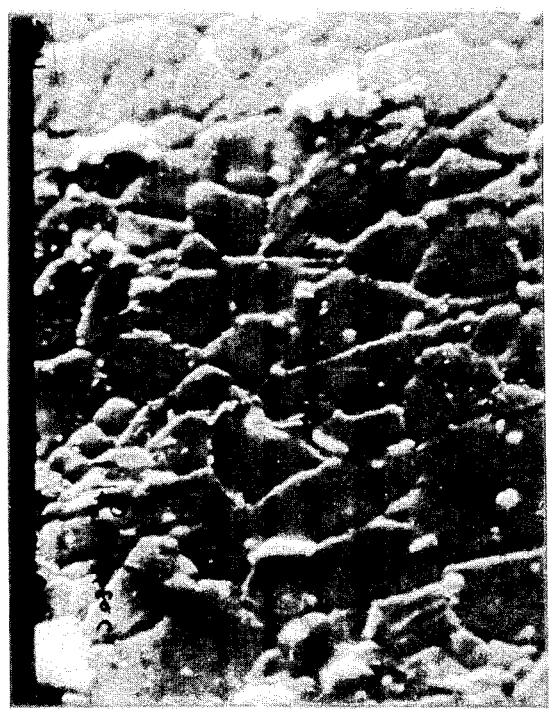
20 MICRONS  FIG.23.

20 MICRONS

20 MICRONS    FIG.25.
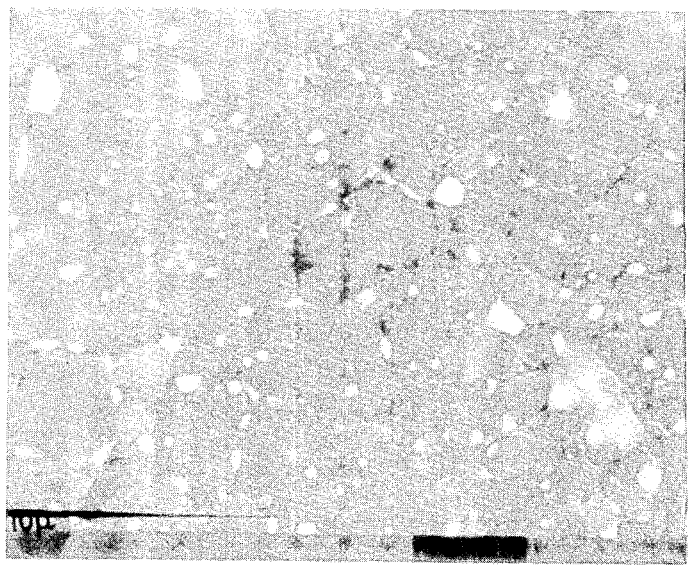
10 MICRONS    FIG.26.

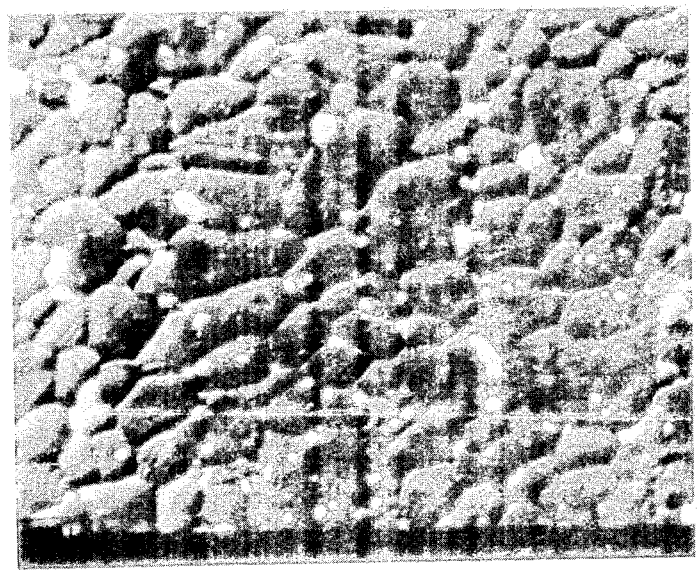
20 MICRONS   FIG 27.
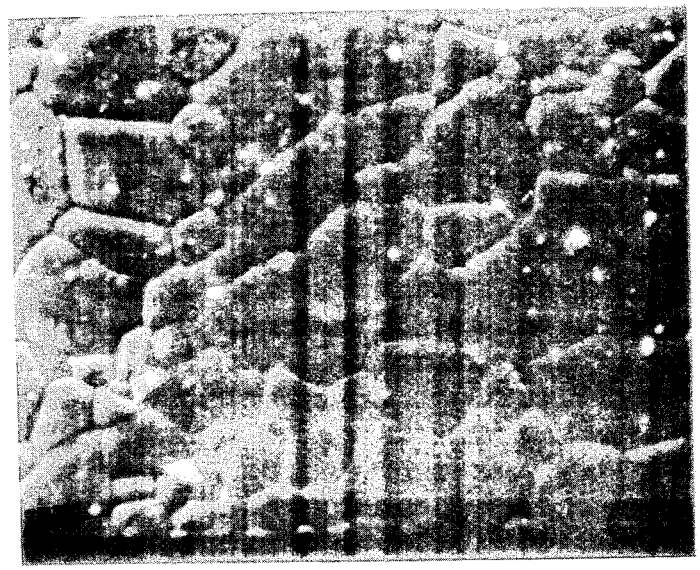
40 MICRONS   FIG.28.

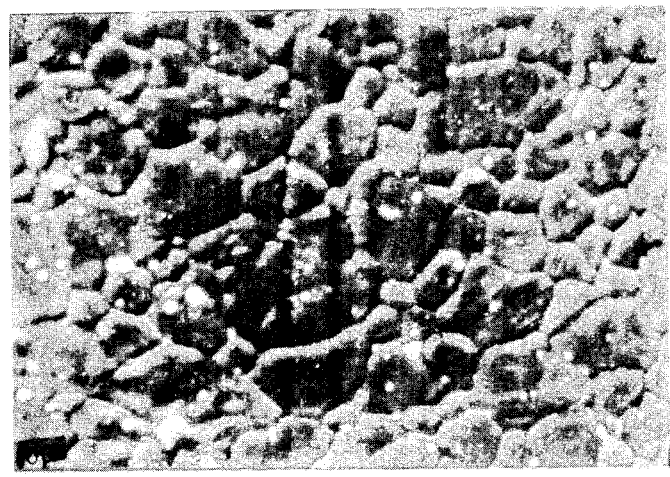
40 MICRONS   FIG.29.
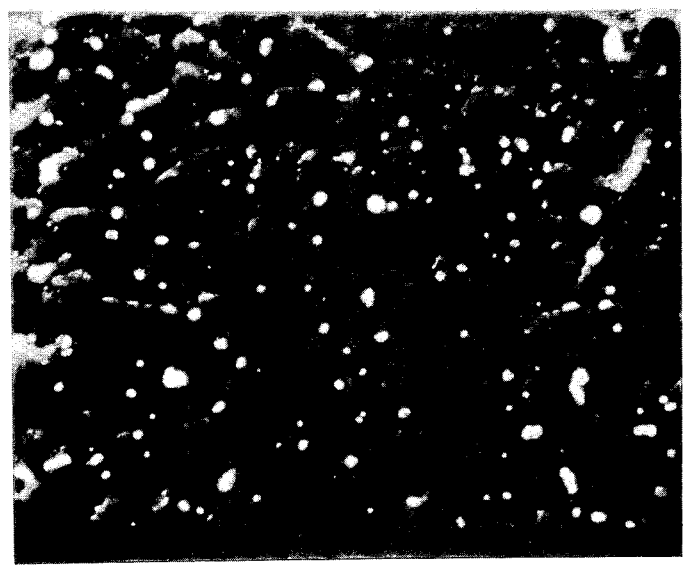
40 MICRONS   FIG.30.

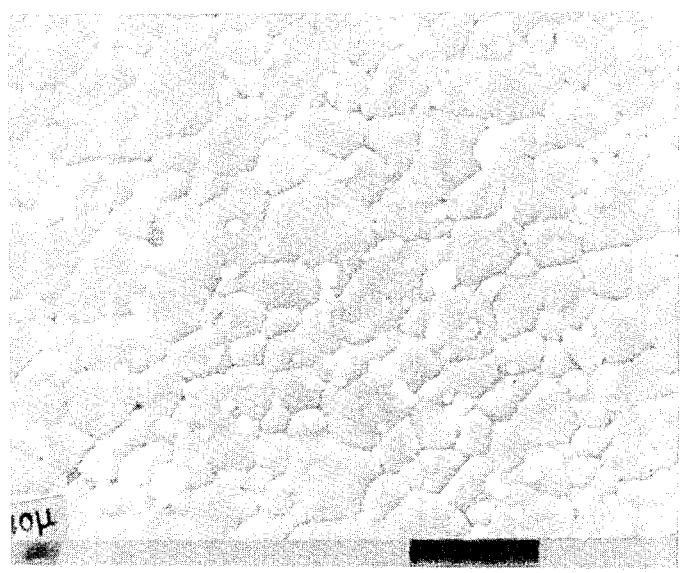
40 MICRONS   FIG.31.
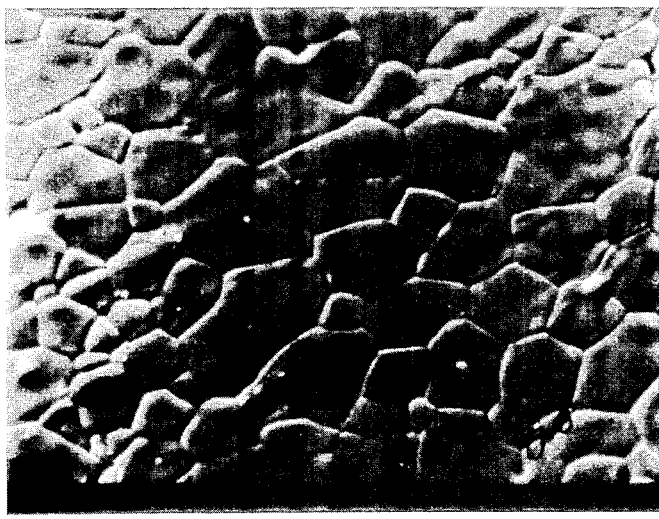
40 MICRONS   FIG.32.

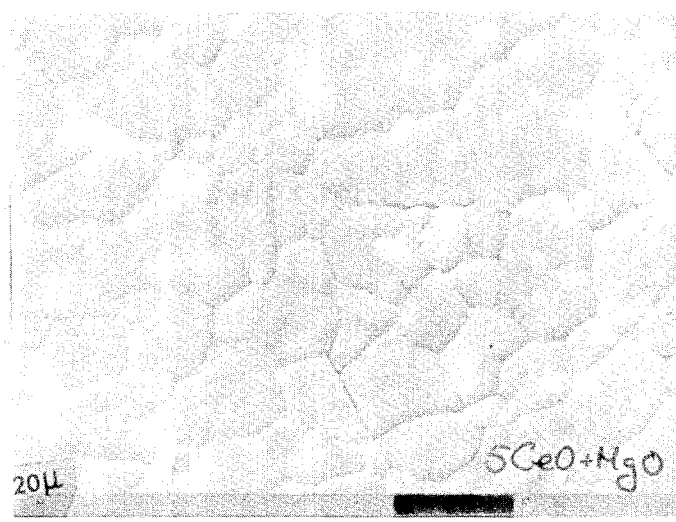
20 MICRONS    FIG. 33.
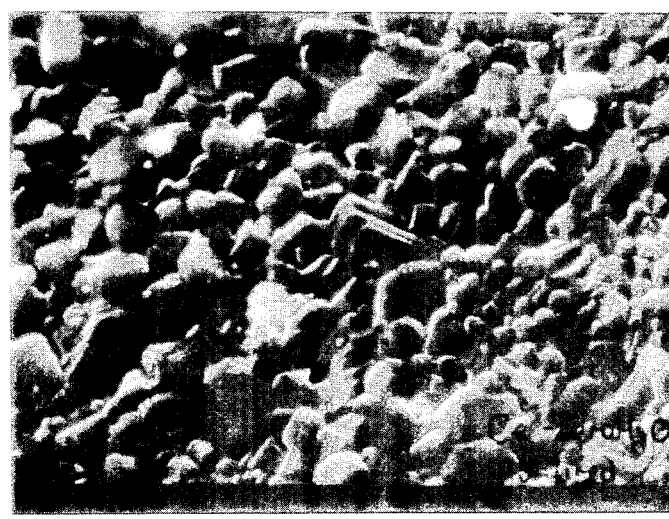
10 MICRONS    FIG. 34.

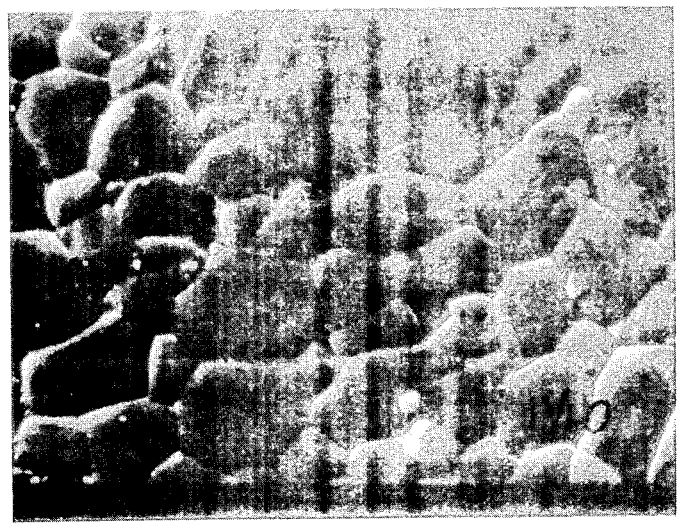
20 MICRONS    FIG.35.
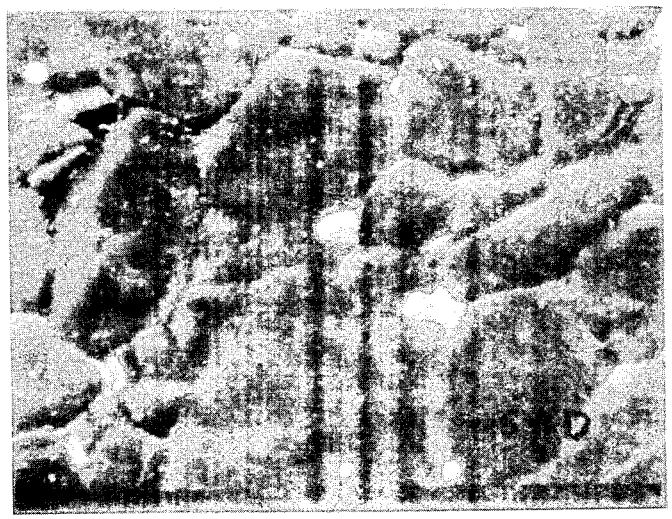
20 MICRONS    FIG.36.

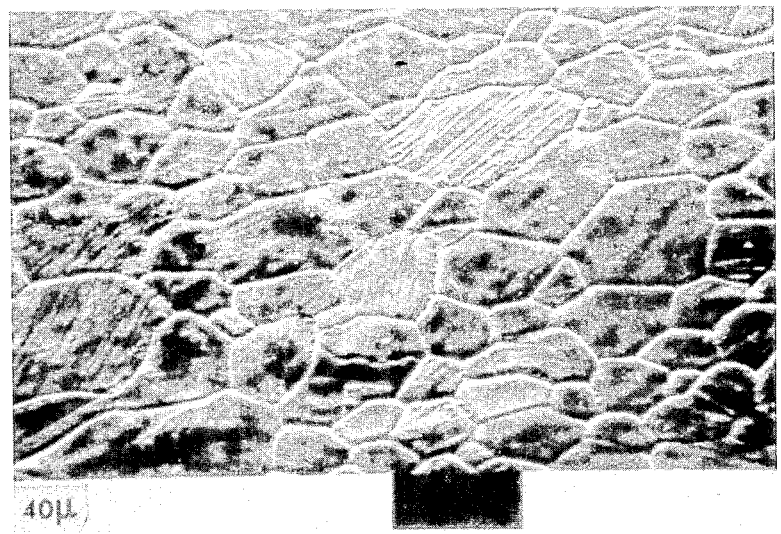
40 MICRONS    FIG. 37
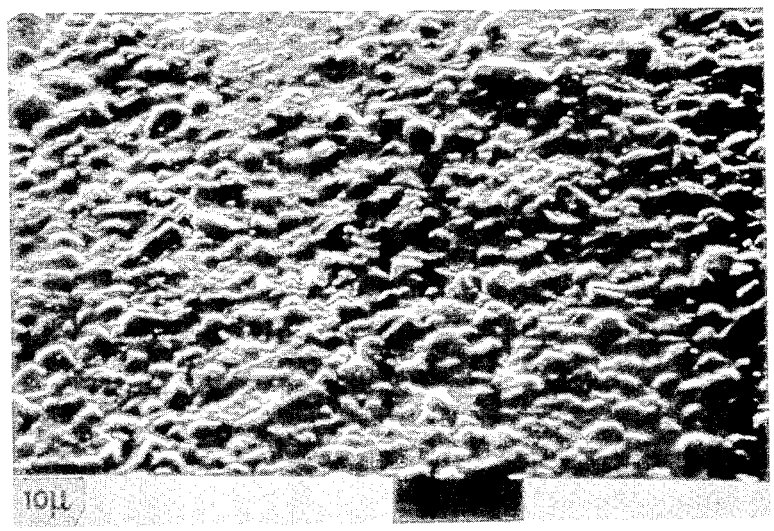
10 MICRONS    FIG. 38.

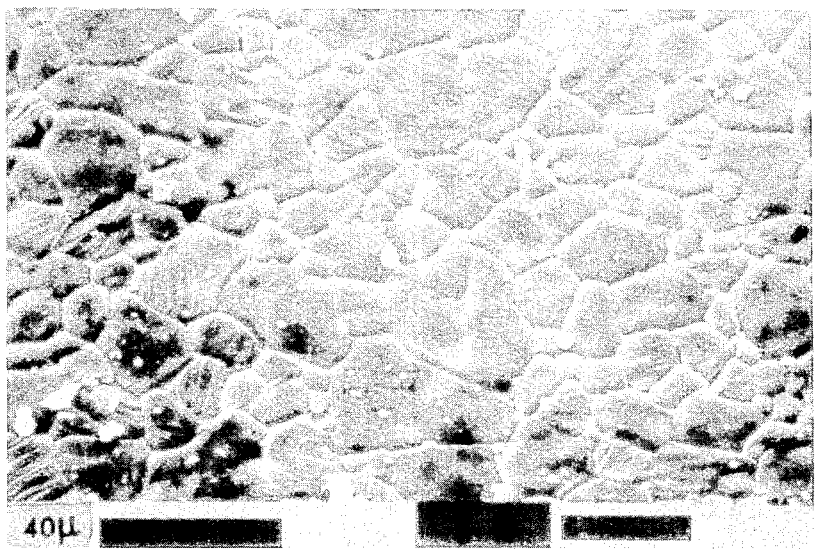
40 MICRONS  FIG. 39.

BERYLLIUM OXIDE BASED CERAMICS

This application is a continuation of U.S. patent application Ser. No. 094,725, filed as PCT GB86/00713 on Nov. 21, 1986, published as WO87/03277 on Jun. 4, 1987, now abandoned.

FIELD OF THE INVENTION

The present invention relates to beryllium oxide ceramics.

BACKGROUND OF THE INVENTION

Ceramics based on beryllium oxide (BeO) are well known and are valued for their high thermal conductivity combined with high dielectric strength, which, in combination with their mechanical properties, makes them useful as substrates for electronic circuits though this is only one of many commercial applications for the product.

Conventional beryllium oxide ceramics for such end uses typically contain 99.5% by weight BeO and have added 0.3% by weight magnesium oxide (MgO) and 0.2% silica ($SiO_2$). This forms a phase which aids densification of the green body and bonds together the beryllium oxide (BeO) grains. The density of ceramics formed on sintering this composition is usually in the range 2.85-2.91 grms cc resulting in a remnant closed porosity of 3.3-5.3%. The grain size of the ceramic is typically 20-30 microns with the remnant porosity present both within the grains and also at the grain boundaries. This means that the smoothness of the surface which can be obtained by polishing is limited and on the microscopic scale now involved in electronic circuits the surface is liable to present fissures with the attendant risk of gaps in thin metallic film circuits which pass over such fissures.

Previously $SiO_2$ has been added with MgO to reduce the sintering temperature of BeO from approximately 1800° C. to more manageable and economic levels namely around 1500° C. and also to act as a grain controller i.e. helping maintain an even grain size.

Beryllium oxide ceramics are often used in electronic circuits as wafers e.g. 0.5 mm thick and 4 1/2×4 1/2 inch (11.4 cms×11.4 cms) square. High strength is called for, and a recent change in circuit fabrication has led to the desire for higher strength still. Thus before this change the method for attaching the electrical device to the beryllia substrate was by forming an intermediate nickel layer on the ceramic wafer. This arrangement gave a thermal conductivity reduced by about 10%. The technique now preferred is to clamp the BeO wafer to the metallic device giving a direct pressure contact.

It is desired to have as high a density as possible. The theoretical density for BeO is 3.01. The commercial grade of BeO ceramic mentioned above has a density of 2.85-2.91, this varying with a Particular batch of oxide received from the suppliers. For a typical conventional BeO ceramic containing 0.3% MgO, 0.2% $SiO_2$, 99.5% BeO plus trace elements having a theoretical density of 3.01, a density in the range 2.85-2.91 is 94.7% to 96.6% of the theoretical density. The remnant porosity which can be up to 5.3% by volume, is particularly important since it is mainly responsible for the limitation of properties of importance in design and fabrication of devices using beryllia ceramic.

Thus an increase in density may also be expected to result in a superior material, the removal of flaws associated with the porosity giving rise to a ceramic having a higher fracture stress, with less tendency to chipping and grain displacement on machining.

DESCRIPTION OF THE PREFERRED EMBODIMENTS

Figure 1A:
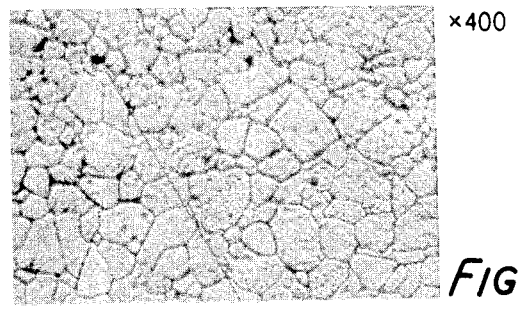

According to one aspect of the present invention a beryllium oxide based ceramic composition contains magnesium oxide and a defined rare earth oxide in amounts such as to have a surface grain size modifying effect on firing of the composition, the defined rare earth oxide being an oxide of zirconium, hafnium, yttrium, cerium or ytterbium or thorium or a mixture thereof. According to a preferred aspect a fired ceramic is made by firing a mixture comprising (on a dry weight basis) magnesium oxide (MgO) in an amount up to 2% by weight, a defined rare earth oxide in an amount up to 10% by weight, balance beryllium oxide, and trace elements, the defined rare earth oxide being zirconium oxide ($Zr_{O2}$), hafnium oxide ($HfO_2$), cerium oxide ($Ce_2O_3$), yttrium oxide ($Y_2O_3$), ytterbium oxide ($Yb_2O_3$), or thorium oxide.

More broadly the defined rare earth oxide content can be specified in mole % terms, and may be up to 0.15 mole % e.g. up to 0.11 mole % or up to 0.07 mole % or up to 0.04 mole %.

A preferred form of the fired ceramic is made by firing a mixture comprising (on a dry weight basis) magnesium oxide (MgO) in an amount up to 2% by weight, defined rare earth oxide in an amount up to 10% by weight, balance beryllium oxide, and trace elements, or beryllium oxide and a supplementary ceramic material, and is free of silicon dioxide or silicon compounds or contains less than 0.05% by weight thereof.

Trace elements typically present in beryllium oxide according to manufacturers specification are as follows: sulphur 0.15% maximum, aluminium 100 parts per million (ppm), calcium 50 ppm, iron 50 ppm, magnesium 50 ppm, silicon 100 ppm, sodium 50 ppm, boron 3 ppm, cadmium 2 ppm, chromium 10 ppm, cobalt 3 ppm, copper 10. 5 ppm, lead 5 ppm, lithium 3 ppm, manganese 5 ppm, molybdenum 5 ppm, nickel 10 ppm, potassium 50 ppm, silver 3 ppm.

Thus total trace elements are not more than 504 ppm (0.0504%) plus 0.15% sulphur i.e. 0.2004%. More broadly trace elements will desirably be less than 0.21%.

The amount of magnesium oxide (on a dry weight basis) used in the mixture which is fired is preferably in the range 0.01 to 2% e.g. 0.1 to 1% by weight, more preferably 0.1 to less than 0.5 wt%, especially 0.1 to 0.3, 0.4 or 0.49 wt% e.g. about 0.2 wt%, the latter value being particularly preferred for the composition containing 2% by weight of defined rare earth oxide especially $ZrO_2$. The amount (on a dry weight basis) of defined rare earth oxide used in the mixture which is fired is preferably in the range 0.1 to 9.5% by weight, more preferably 1.0 to 9.0 or 7.0 especially 1.5 to 6.5 wt%. The amount of defined rare earth oxide is preferably in the range 1 to 4% by weight to obtain high densities and in the range 4% to 10% where greater control of the grain size is required at the expense of a slight decrease in density.

The defined rare earth oxide should substantially be free of silica. However, typical commercially available $ZrO_2$ contains hafnia in amounts up to about 2% by weight. It is preferred that the $ZrO_2$ be at least about 98% by weight $ZrO_2$ with substantial absence of silica.

A preferred form of fired ceramic is made by firing a mixture comprising (on a dry weight basis) 0.1 to 0.3% e.g. about 0.2% by weight magnesium oxide, 1.85 to 5% e.g. 2 to 5.0% by weight defined rare earth oxide, balance beryllium oxide and trace ingredients, or beryllium oxide and a supplementary ceramic material and is substantially free of silicon dioxide or silicon compounds.

The invention also extends to a green ceramic composition comprising beryllium oxide particles and defined rare earth nitrate or acetate or any soluble salt which will decompose on heating to 800° C. or more broadly 1100° C. to provide up to 10% by weight of defined rare earth (as the oxide), and preferably 0.5 to 5% by weight, more preferably 1 to 4.5 wt%, and magnesium nitrate or magnesium acetate or any soluble magnesium salt which will decompose on heating to 800° C. or more broadly 1100° C. to provide up to 2% by weight of magnesium (as MgO), preferably 0.1 to 1% by weight, more preferably 0.1 to 0.7 wt%, especially 30. 0.1 to 0.3 wt% e.g. about 0.2 wt%.

Another aspect of the invention provides a beryllium oxide based shaped ceramic component having, as fired, a surface smoothness (as herein defined) of 10 microinches (0.25 microns) or less, a density of at least 98% of theoretical density preferably at least 98.5% or 99% or 99.5% and an elastic modulus E (as herein defined) of at least 350 preferably at least 355 or 360 GPa (GigaPascals).

The invention also extends to a method of making a ceramic as specified above in which the magnesium and the defined rare earth are introduced in the form of a soluble salt, for example the nitrate or acetate, or a complex ammonium carbonate, such as ammonium zirconium carbonate, preferably into the green mix and then converted at temperatures below the sintering temperature of the BeO to the oxides.

The defined rare earth oxide may be used in admixture with less than 50% by weight of the other defined rare earth oxides or other rare earth oxides or mixtures thereof. Care must be taken when other rare earths are used that the amount used does not depress the melting point of the mixture too much so that the grain size becomes too large. However the defined rare earth oxide is preferably used in substantially pure form e.g. preferably at least 95% pure, desirably at least 98% pure by weight.

Ceramics in accordance with the present invention may contain a supplementary ceramic material or materials dispersed through the BeO matrix.

An example of a supplementary ceramic material is silicon carbide. The characteristics of a material suitable for use as a supplementary ceramic material are that it should not interfere with the interaction between the beryllium oxide, the magnesium oxide and the defined rare earth oxide to any material extent such as to prevent the achievement of enhanced physical properties of the ceramic which are apparent when the three classes of oxides are used together but in the absence of the supplementary ceramic.

A wide range of proportions of supplementary ceramic material may be used and a variety of such materials exist and can afford to a composite ceramic containing them a range of different desirable characteristics.

Figure 2A:
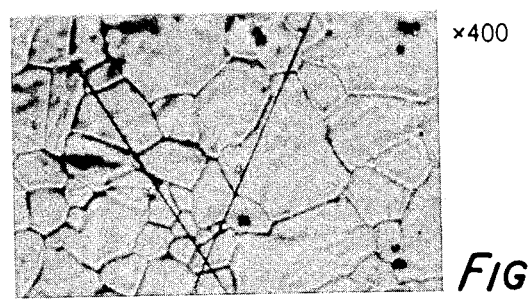
Figure 3A:
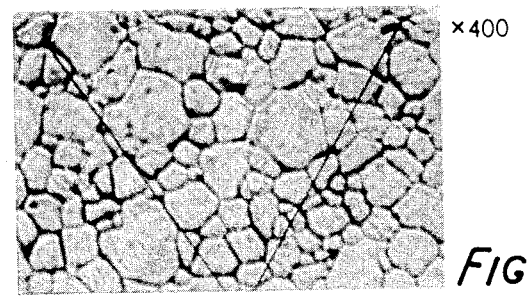
Figure 4A:
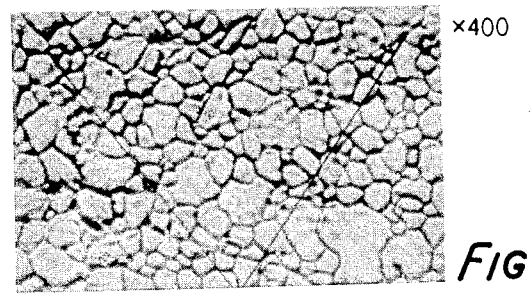
Figure 2B:
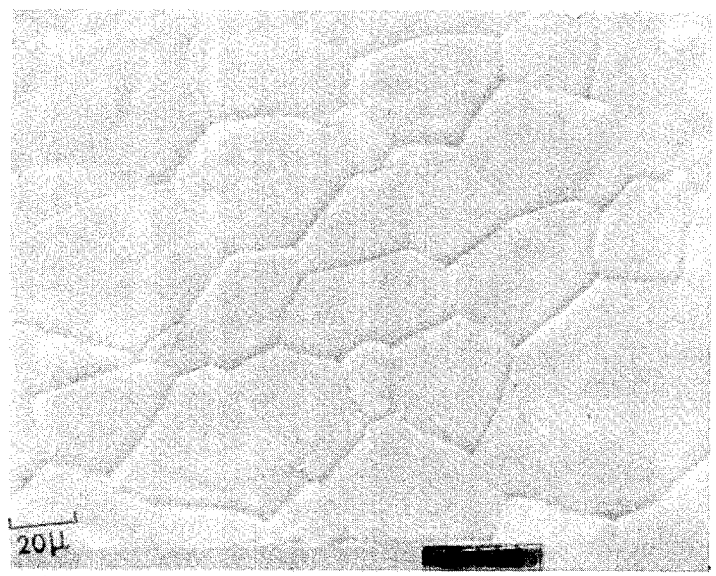
Figure 5B:
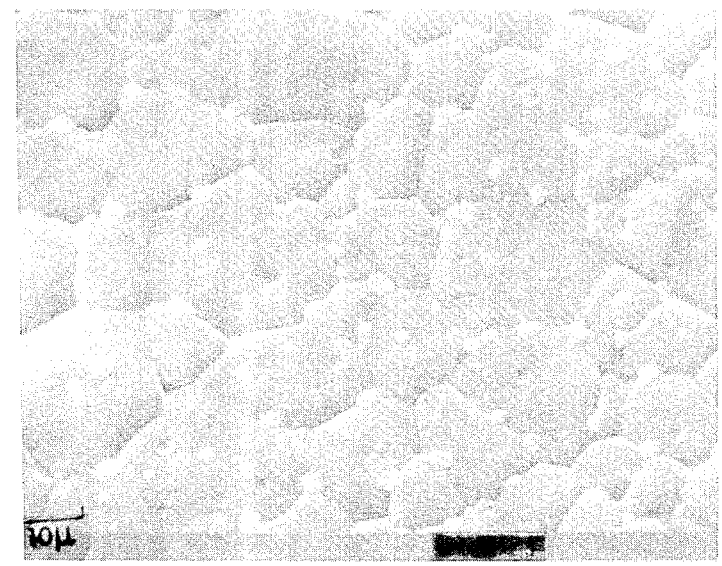
Figure 5A:
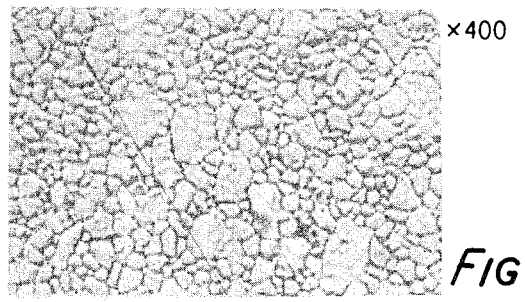
Figure 6A:
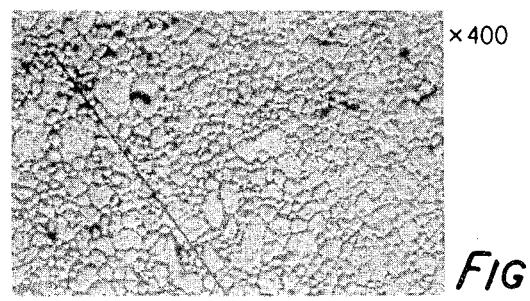
Figure 7A:
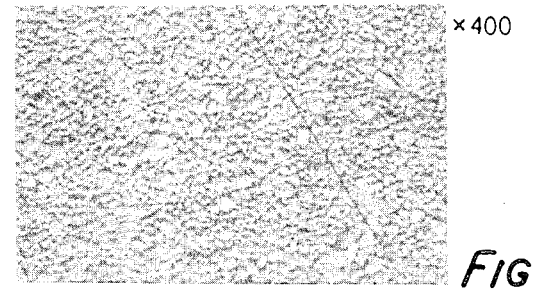
Figure 8A:
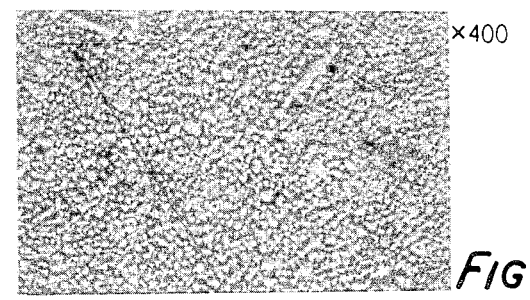
Figure 6B:
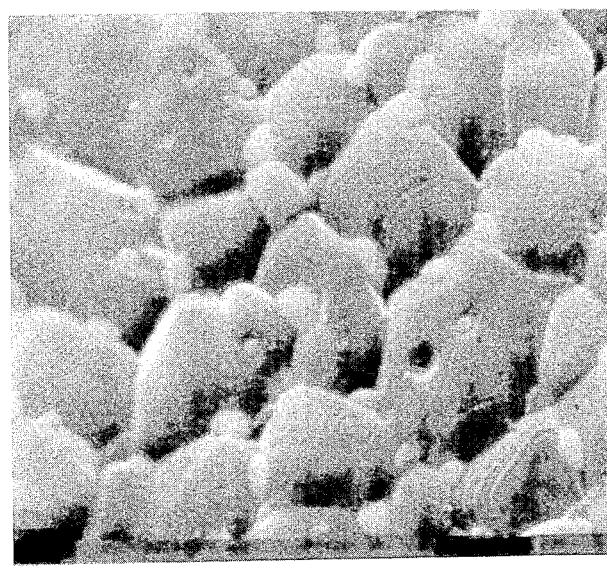
Figure 7B:
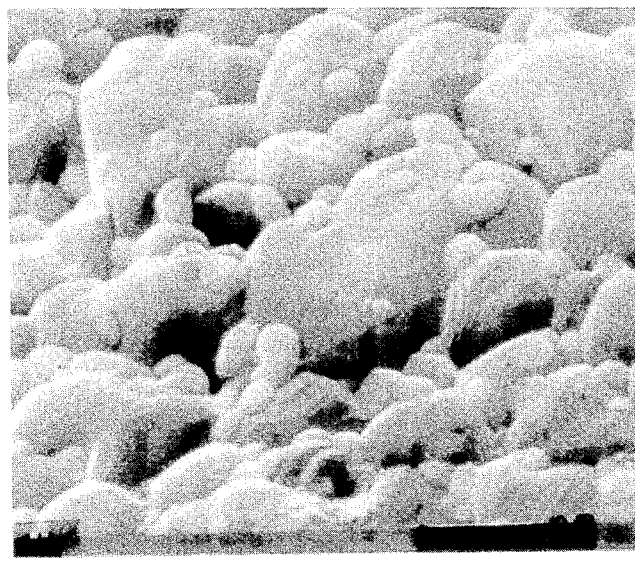
Figure 8B:
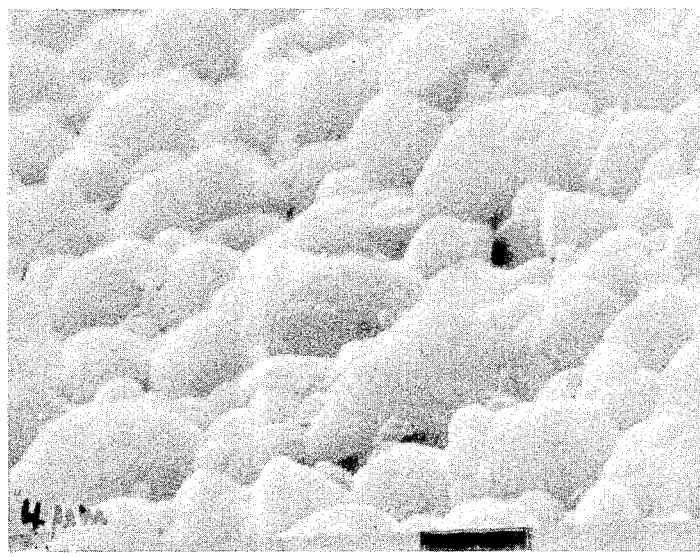

The invention may be put into practice in various ways and a number of specific embodiments will be described to illustrate the invention with reference to the accompanying examples. EXAMPLES Examples 1 to 53 relate to the use of zirconium oxide as the defined rare earth oxide and FIGS. 1 to 23 and relate to these examples;

FIGS. 1 to 8 show the as-fired surface of materials produced in accordance with Examples 1 and 26 to 32 respectively;

FIG. 1A relates to Example 1;
FIGS. 2A, B and C relate to Example 27;
FIGS. 3A, B, C and D relate to Example 28;
FIGS. 4A, B, C and D relate to Example 29;
FIGS. 5A, B, C and D relate to Example 30:
FIGS. 6A, B and C relate to Example 31;
FIGS. 7A, B and C relate to Example 32; and
FIGS. 8A, B and C relate to Example 33;

The photographs are electron scanning photomicrographs of the as fired products of the above examples, FIGS. 1 to 6, taken at a 90° angle to the surface and FIGS. 7 and 8 at 45° and printed at various magnifications.

The A figures are all at 400 fold magnification, the B and C figures are at higher magnification, scales being given in microns on each of the B and C figures.

Table 5B describes FIGS. 10 to 14,
Table 6B describes FIGS. 15 and 16 and
Table 7B describes FIGS. 17 to 22.

Examples 54 to 63 relate to the use of hafnium oxide as the defined rare earth oxide and FIGS. 23 to 31 relate to these examples.

Table 8B describes FIGS. 23 to 27 and
Table 9 describes FIGS. 28 to 31.

Examples 64 to 66 relate to the use of cerium oxide as the defined rare earth oxide and FIGS. 32 to 34 relate to these examples, Table 10B describes FIGS. 32 to 34.

Examples 67 and 68 relate to the use of ytterbium oxide as the defined rare earth oxide and FIGS. 35 and 36 relate to these examples, Table 11B describes FIGS. 35 and 36. Example 69 relates to the use of a supplementary ceramic material namely silicon carbide.

EXAMPLE 1

This describes the preparation of a conventional BeO ceramic. UOX grade BeO (of surface area 11–12 $m^2$/gram (BET)) is mixed and milled with 0.12 vol % (0.16 wt%) MgO and 0.45 vol % (0.34 wt%) $SiO_2$ as an aqueous alkaline slurry with conventional defloculants and conventional binders. The slip is spray dried and the resultant powder then pressed to shape (under a pressure of 12 tons/sq. inch (27000 psi) (185.4 MPa )) and is the green product. This level of compression produces a shrinkage of 17.5% on firing and the dies are dimensioned so that this results in the fired product having the desired final dimensions. The dried green biscuit is then preferably fired at 800° C. to remove organic constituents by evaporation and oxidation giving a burnt product. It is then fired conventionally at 1505° C. for 4½ hours.

More broadly the firing may be carried out at a temperature in the range 1450–1505° C. for times ranging from ½ hour to 16 hours, preferably 1480° C. for 4 to 8 hours. The green biscuit may be burnt to remove binders at a temperature in the range 300 to 800° C. depending on the binder used.

The product has a grain size of about 20–40 microns, a densification parameter of 0.88 to 0.90, a density of 96.7% of theoretical, an elastic modulus of 348 GPa and a micrófinish, $R_a$, of 15–20 microinches (4–5 microns) as measured by a diamond stylus using a SURFCOM surface roughness and contour measuring instrument.

Grain size is determined by drawing a straight line (at random) equivalent to 250 microns long across a magnified photomicrograph (FIGS. 1A, 2A, 3A, 4A, 5A, 6A, 7A and 8A are examples) (400 fold magnification) of a rubber replica of the surface (hills rather than valleys) and measuring the number of grain boundaries intercepted by the line and then dividing 250 by that number to give average grain size.

The minimum grain size discernable by this method is about 4 microns.

The replicas are produced by spreading a solution of DUROFIX glue (pyroxalin in 2-ethoxy ethanol) over the surface to be studied, drying the glue with infrared radiation and peeling it off as a continuous layer and observing the lower surface which replicates the free surface of the ceramic.

The SURFCOM instrument is manufactured by Advanced Metrology Limited, Oadby, Leicestershire.

In this instrument $R_a$, the roughness average, is measured by drawing a diamond stylus across the test surface over a set traverse length and continuously measuring the frequency of the vibration of the tip caused by the roughness of the material.

$R_a$ is the arithmetic average value of the departure of the profile from the centre line throughout the sampling length or traverse length.

$R_a$ is measured on a traverse length of 2.5 mm.

The surface, in addition to having roughness, may also undulate and means are provided in the instrument to discriminate between the high frequency vibration due to roughness and the lower frequency vibration due to any undulation or waviness and this latter lower frequency vibration is eliminated electronically.

The measurement of surface roughness is thus in accordance with International Standards Organisation Standard No. 1878 and a cut-off value of 0.8 is used.

Densification parameter (D.P) is a useful way of comparing the degree of densification of the structure of sintered materials made from ingredients of different absolute densities.

$$D.P = \frac{\text{density sintered body} - \text{density unfired pressed body}}{\text{theoretical density} - \text{density unfired pressed body}}$$

The unfired pressed body is also referred to as the green body.

Elastic modulus, E, as referred to herein is measured by a non-destructive test which is carried out as follows:

The sample is in the form of a rod 5 mms in diameter with parallel flat end faces at right angles to the axis of the rod. The end faces of the are painted with conductive silver paint and a band is painted around the circumference of the rod at its midpoint. The end faces and the band are connected by a strip of silver paint extending along the rod. The rod is mounted on two brass pin point contacts set at about 45° to the horizontal facing inwards and upwardly and held On these contacts by a heavy pivoted lever bearing across the top of the rod under gravity. One of the pins is earthed. A pair of micrometer screws in juxtaposed end to end relationship abut the parallel ends of the rod. The micrometers are first adjusted to centre the rod around the point contacts. The end face of one micrometer carries an electrostatic transducer affording a plane end face opposed to that of the sample, and the transducer is connected to a generator of kilohertz frequency vibrations. The end face of the other micrometer carries a receiver affording a plane end face opposed to the other end of the sample, and the receiver is connected to an oscilloscope.

The micrometers are then screwed outwardly to leave an air gap between the transducer and its end of the rod and the receiver and its end of the rod. These air gaps act as capacitors. The generator is then switched on and the frequency increased and the air gap varied until a maximum amplitude sine wave is observed on the oscilloscope. The frequency generator is such that it senses when the rod resonates and locks its frequency at that point. The frequency is displayed on a digital read out and this frequency, F, the resonant frequency, is used to calculate elastic modulus, E, from the equation $$E = 4 F^2 \times L^2 \times p \text{ eqt.} \qquad (1)$$

where
F is the resonant frequency,
L is the length of the rod in mm, and rho (p) is the density in Kg/m³.

This is the E uncorrected and is the E as defined herein and is quoted in GigaPascals (GPa).

Surface finish or smoothness of the ceramic substrate is important when it is wished to deposit metal on the surface by sputtering. Sputtering is a process in which the object to be coated and a metal source are placed in a chamber which is evacuated and then the metal heated to cause it to evaporate and deposit on the object.

The density of $ZrO_2$ is 6 that of BeO 3.01.

EXAMPLE 2

The burnt product of Example 1 is self-supporting and though very porous it can be soaked in water without falling apart. It has a density of 2.1-2.2 i.e. it has a porosity of about 40%. This product weighing 1.5 g was boiled under normal atmospheric pressure in 100 ml of 2.5% zirconium nitrate for 30 minutes which removed all the air. The product was wiped, dried and fired at 1505° C. for 4½ hours. This product had a density of 2.89 with a substantially smaller grain size of 1-2 microns.

EXAMPLE 3

Example 1 was repeated using 0.12 vol % (0.16 wt%) MgO and replacing the silica with $ZrO_2$ (partially stabilized with a small amount (e.g. 3 mol%) of yttrium oxide added as a solid) in an amount of 0.18 vol % (0.34 wt%) of the oxides. The grain size was more regular than in the sintered product of Example 1.

EXAMPLE 4

Example 3 was repeated except that 0.25 vol % (0.34 wt%) MgO was used and 1 vol % (1.85 wt%) $ZrO_2$.

EXAMPLE 5

The procedure of Example 1 was repeated using as an initial mix 100 g of UOX grade BeO mixed with 0.34 g of $SiO_2$, 1.85 g of $ZrO_2$ and 1.02 g of magnesium nitrate (which supplied 0.16 g of MgO). The properties were inferior to those of Examples 3 and 4.

EXAMPLE 6

Example 3 was repeated but with the $ZrO_2$ increased to 0.92 vol % (1.7 wt%).

The product had a significantly more regular grain structure than that of Example 3 or Example 4. The products of Examples 3, 4 and 6 all contain rounded particles to be found mainly on the grain boundaries. Electron scanning microscopy and EDAX analysis reveals these particles to contain zirconium.

EXAMPLE 7

Example 3 was repeated but adding the magnesium and zirconium as nitrate solutions. The $ZrO_2$ was thus not yttria stabilized. Thus the green product was made from 100 g UOX grade BeO, 1.27 g magnesium nitrate (hydrated) (which provided 0.2 wt% of MgO) and 10% by weight of zirconium nitrate solution which contained 20% by weight of zirconium nitrate (and thus supplied 0.34 wt% of $ZrO_2$) and was free of added silica. The green product was then burnt at 800° C. and this converted the nitrates to oxides.

The sintered product had a density of 2.95–2.97 (98.3% of the theoretical density of 3.02) and a more regular and more dense structure than the product of Example 3 and also fewer internal holes i.e. porosity within the grains on microscopic examination.

A comparison of toughness and hardness by the test given below showed a marked improvement in the sintered product of Example 7 when compared with that of Example 1.

Thus the toughness rises from 3.5 to 5.1, an increase of 47% and the hardness from 8.2 to 9.8, an increase of 19%.

Indentation measurements using a pyramidal diamond indentation test on a ZWICK microhardness tester were used to measure hardness and toughness. In the procedure the sample is placed on the sample table of the instrument and the microscope used to focus on the surface of the sample. A diamond pyramid stylus, point down, is mounted on the microscope and the array pivoted for rotation about a vertical axis so that, once the microscope is focussed on the surface, swinging the microscope to the side brings the stylus into exact contact with the surface. The stylus is then loaded with a load, LD, of 10 Kg load for 5 secs. and the load then removed. It is most important to try to keep this loading time constant and errors in this factor can have a significant effect on the measured value. However the test is useful to differentiate materials of similar but different toughness. The stylus is then swung away and the square indentation observed and the diagonal lengths D1 and D2 of the indentation and the length C1 and C2 of the cracks from end to end across the diagonals D1 and D2 and extending out from the corners of the square measured using the optical grating in the microscope. D1 and D2 are used to give the hardness H, by substitution in the equation:

$$H = \frac{0.189 \times LD \times 9.81}{DA^2 \times 10,000} \qquad \text{eqt. (2)}$$

where LD is the load, in this case 10 Kg, and DA is $DT/(2 \times H1)$, where

H1 is the number of indentations carried out, and

DT is the total length of the indent diagonal measured namely $(D1+D2) \times H1$ C1 and C2 are used to give the toughness, T, by substitution in the equation:

$$T = 0.016 \times \left(\frac{E}{H}\right)^{0.5} \times LD \times 9.81 / \left(\frac{CA}{2}\right)^{1.5} \times 1000 \qquad \text{eqt. (3)}$$

where

E is the elastic modulus

H is hardness from equation (2), and

CA is the crack average, $(C1+C2)/2$.

EXAMPLES 8 to 12

A series of compositions were made up using the ingredients and procedure of Example 3 and containing varying vol % of $ZrO_2$ (yttria stabilized as in Example 3).

The proportions and properties are given in Table 1 below.

TABLE 1

| Ex. | Vol % $ZrO_2$ | Wt % $ZrO_2$ | Density | [1]D.P. | grain size (microns) |
|---|---|---|---|---|---|
| 8 | 1 | 1.85 | 2.97 3.02 | 0.96 | 12–15 |
| 9 | 2 | 3.7 | 2.98 3.05 | 0.94 | 11 |
| 10 | 5 | 9.25 | 3.06 3.14 | 0.94 | 6.5 |
| 11 | 10 | 18.5 | 3.17 3.27 | 0.94 | 5 |
| 12 | 20 | 37.0 | 3.44 | 0.94 | less than 4 |

Note on Table 1
[1]D.P. is the densification parameter which is discussed above in Example 1.

Examples 8 to 10 had hardness values of 9.3 and toughness values of 4.4, but Examples 11 and 12 whilst having values of H of 8.6 and of T of 4.4 disintegrated when stressed e.g. when drilled or hit with a hammer.

EXAMPLES 13 to 17

A series of compositions were made up using the ingredients and procedure of Example 7 and containing varying proportions of zirconium as $ZrO_2$; the zirconium thus being added as zirconium nitrate.

The proportions of the green products and the proportions and properties of the fired ceramic product are given in Tables 2A and 2B respectively below

TABLE 2A

| Ex. | Vol % $ZrO_2$ | Wt % Magnesium nitrate | Wt % Zirconium nitrate solution based on BeO | Wt % $ZrO_2$ |
|---|---|---|---|---|
| 13 | 1 | 1.27 | 10 | 1.85 |
| 14 | 2 | 1.27 | 20 | 3.7 |
| 15 | 5 | 1.27 | 50 | 9.25 |
| 16 | 10 | 1.27 | 100 | 18.5 |
| 17 | 20 | 1.27 | 200 | 37.0 |

EXAMPLES 18 to 22

TABLE 2B

| Ex. | Vol % $ZrO_2$ | Wt % $ZrO_2$ | Density | D.P. | Grain size (Microns) | Comments |
|---|---|---|---|---|---|---|
| 13 | 1 | 1.85 | 2.97 | 0.96 | 12–15 | grains fairly regular |
| 14 | 2 | 3.7 | 2.99 | 0.94 | 11 | grains fairly regular |
| 15 | 5 | 9.25 | 3.03 | 0.94 | 6.5 | cleaner fracture structure |

TABLE 2B-continued

| Ex. | Vol % ZrO$_2$ | Wt % ZrO$_2$ | Density | D.P. | Grain size (Microns) | Comments |
|---|---|---|---|---|---|---|
| 16 | 10 | 18.5 | 3.05 | 0.94 | 5 | better than Ex. 16, with less grain pull out |
| 17 | 20 | 37.0 | 3.03 | 0.94 | less than 4 | Crumbled when subjected to severe drilling |

EXAMPLES 18 to 22

The procedure of Example 3 was followed except that the zirconium was added as zirconium nitrate rather than ZrO$_2$ (stabilized with 3 mol% yttria) in the form of a powder. The zirconium was thus added by wetting the BeO and MgO powder with zirconium nitrate solution (20% by weight zirconium nitrage) and the mixture dried and then heated to 350° C. This results in the nitrate coating on the individual BeO and MgO particles being converted to ZrO$_2$. The mixture was then ball milled, the binders added and milled in, the mixture pressed to shape as wafers 0.5 mm×4½ inch (11.4 cm)×4½ inch (11.4 cm). These were then fired at 1505° C for 4½ hours.

The proportions of the green products and the proportions and properties of the sintered fired ceramic products of these examples are given in Tables 3A and 3B respectively below.

TABLE 3A

| Ex. | Vol % ZrO$_2$ | Wt % Magnesium Nitrate | Wt % Zirconium Nitrate solution based on BeO | Wt % ZrO$_2$ |
|---|---|---|---|---|
| 18 | 0.18 | 1.27 | 1.7 | 0.34 |
| 19 | 1 | 1.27 | 10 | 1.85 |
| 20 | 2 | 1.27 | 20 | 3.7 |
| 21 | 5 | 1.27 | 50 | 9.25 |
| 22 | 10 | 1.27 | 100 | 18.5 |

TABLE 3B1

| Ex. | Vol % ZrO$_2$ | Wt % ZrO$_2$ | Density | D.P. | Grain size (Microns) |
|---|---|---|---|---|---|
| 18 | 0.18 | 0.34 | 2.98 | 0.985 | 14–17 |
| 19 | 1 | 1.85 | 3.0 | 0.985 | 10 |
| 20 | 2 | 3.7 | 3.05 | 0.98+ | 10 |
| 21 | 5 | 9.25 | 3.12 | 0.97 | 5 |
| 22 | 10 | 18.5 | 3.23 | 0.95 | less than 4 |

TABLE 3B2

| Ex. | Vol % ZrO$_2$ | Wt % ZrO$_2$ | H Hardness CPa | T Toughness MPa M$^{-0.5}$ | E GPa |
|---|---|---|---|---|---|
| 18 | 0.18 | 0.34 | 8.4 | 4.2 | 360 |
| 19 | 1 | 1.85 | 9.3 | 4.2 | 359 |
| 20 | 2 | 3.7 | — | — | — |
| 21 | 5 | 9.25 | 9.8 | 3.4 | 357 |
| 22 | 10 | 18.5 | 8.4 | 4.4 | 345 |

EXAMPLE 23

Example 1 was repeated but using 0.17 vol % (0.20 wt%) MgO and omitting the silica. The density was 2.93 an improvement on Example 1 but much less than the examples containing MgO and ZrO$_2$ in the defined ranges.

EXAMPLE 24

Example 7 was repeated but using 1 vol % (1.85 wt%) ZrO$_2$ and 0.17 vol % (0.20 wt%) MgO (added as the nitrates). The sintered product had a density in excess of 2.99.

EXAMPLE 25

Example 24 was repeated using 2 vol % (3.7 wt%) ZrO$_2$. Similar results were obtained.

EXAMPLE 26

Example 24 was repeated using 3.5 vol % (6.475 wt%) ZrO$_2$. The results obtained were not as good as in Examples 24 and 25.

EXAMPLES 27 to 33

These examples used the Example 7 procedure but the milling was done in acid media to stop Mg(OH) being precipitated from the MgNO$_3$. A range of ZrO$_2$ additions were carried out, the proportions and properties being given in Table 4A1 and 4A2 below.

200 g UOX BeO was mixed with 400 ml of a mixture of MgNO$_3$ and zirconium nitrate and VIBRA MILLED for 3 hours, the higher concentrations were thick and extra water was added up to 600 ml. The mixture was then spray dried to less than 0.5% H$_2$O content with gentle heating (approx. 80° C.). This mixture was then calcined at 350° C. to convert the nitrates to oxides. This calcined material was then remilled in water for 1 hour the pH being about 6–7 but for the 7.5 and 10% ZrO$_2$ examples the pH was lower, namely about 4. 8 g of wax binder (MOBILCER) (16 cc of aqueous emulsion) was then added and mixing continued for another hour. The slurry was then evaporated to dryness and the damp friable cake crumbled and then sieved through a 1 mm polyethylene mesh. This deformable granule was then pressed into discs in a 25 mm diameter die, 7 mms deep. The discs were 1.5 to 2.5 mm thick depending on the composition.

Each formulation was pressed into about 20 discs at each of three pressures namely 1000, 2000 and 3000 lbs load.

These correspond to 6 tons/sq. inch or 13500 psi (92.7 MPa), 12 tons/sq. inch or 27000 psi (185.4 MPa) and 18 tons/sq. inch or 40500 psi (278.1 MPa) respectively.

The green density is measured from the weight and volume of the disc.

The discs shrink on firing. The 6 tons/sq. inch pressure results in 20% shrinkage, 12 tons in 17.5% shrinkage and 18 tons in 15% shrinkage. A plot of green density versus shrinkage is linear and enables one to achieve defined fired dimensions by pressing to the appropriate green density.

The green discs were then sintered at 1505° C. for 4.5 hours, with a ramp heating sequence from 25° C. to 1505° C. of 120° C./hour, and after a soak at 1505° C. for 4.5 hours, a cooling sequence of 120° C. per hour down to 1000° C. and then allowed to cool to 25° C. over 3 hours. Table 4A1 gives details of the compositions of examples 27 to 33.

Hardness measurements were done on polished samples annealed at 1400° C. for 4 hours. The samples had first been polished whilst potted in epoxy resin. The samples were about 5 mm in diameter. They were polished with diamond paste to optical quality finish. The hardness and toughness were measured as described in Example 7, but using samples removed from the potting resin (by gentle heating to cause them to pop out), and the results are given in Table 4A2.

The annealing has a marked effect in removing the surface stresses induced by the preparation of the sample, namely by the grinding and polishing. Without annealing a load of only 0.5 Kg causes spalling, the surface flaking away.

The material appears to exhibit a form of microplasticity under the indentation conditions employed, the indentation being perfect and the material in the indentation being displaced upwards and outwards.

TABLE 4A1

| Ex. | Vol % ZrO$_2$ | Wt % ZrO$_2$ | Density | Green density | % Shrinkage on firing | % Theoretical density |
|---|---|---|---|---|---|---|
| 27A | 0.18 | 0.34 | 3.0 | 1.52 | — | 99.9 |
| 27B | | | 2.97 | 1.72 | — | 98.8 |
| 27C | | | 2.98 | 1.80 | — | 99.9 |
| 28A | 1 | 1.85 | 2.99 | 1.61 | 19.3 | 99.1 |
| 28B | | | 3.0 | 1.74 | 17.5 | 99.3 |
| 28C | | | 3.01 | 1.80 | 16.3 | 99.7 |
| 29A | 2 | 3.7 | 3.02 | 1.59 | 20.3 | 99.0 |
| 29B | | | 3.03 | 1.71 | 18.3 | 99.3 |
| 29C | | | 3.03 | 1.78 | 17.3 | 99.3 |
| 30A | 3.5 | 6.475 | 3.05 | 1.64 | 20.6 | 98.3 |
| 30B | | | 3.06 | 1.80 | 18.3 | 99.1 |
| 30C | | | 3.06 | 1.85 | 17.2 | 99.1 |
| 31A | 5 | 9.25 | 3.08 | 1.53 | 21.9 | 98.1 |
| 31B | | | 3.11 | 1.65 | 20.0 | 99.2 |
| 31C | | | 3.13 | 1.74 | 18.7 | 99.6 |
| 32A | 7.5 | 12.95 | 3.17 | 1.46 | 24.0 | 98.3 |
| 32B | | | 3.19 | 1.62 | 21.7 | 99.1 |
| 32C | | | 3.18 | 1.73 | 19.7 | 98.8 |
| 33A | 10 | 18.5 | 3.19 | 1.61 | 22.0 | 97.7 |
| 33B | | | 3.17 | 1.73 | 20.2 | 96.8 |
| 33C | | | 3.18 | 1.85 | 18.2 | 97.3 |

The A, B and C examples differ only in the pressures used to make the green disks; thus in Example 27A, 1000 lbs load was used, in Example 27B, 2000 and in Example 27C, 3000.

TABLE 4A2

| Ex. | Vol % ZrO$_2$ | Wt % ZrO$_2$ | DP | % closed porosity | Grain size microns |
|---|---|---|---|---|---|
| 27A | 0.18 | 0.34 | 0.998 | 0.099 | 14–18 |
| 27B | | | 0.971 | 1.2 | 14–18 |
| 27C | | | 0.975 | 0.98 | 14–18 |
| 28A | 1 | 1.85 | 0.981 | 0.91 | 10 |
| 28B | | | 0.982 | 0.75 | 10 |
| 28C | | | 0.992 | 0.34 | 10 |
| 29A | 2 | 3.7 | 0.98 | 1.02 | 8–10 |
| 29B | | | 0.985 | 0.66 | 8–10 |
| 29C | | | 0.987 | 0.56 | 8–10 |
| 30A | 3.5 | 6.475 | 0.97 | 1.4 | 6 |
| 30B | | | 0.98 | 0.8 | 6 |
| 30C | | | 0.98 | 0.9 | 6 |
| 31A | 5 | 9.25 | 0.963 | 1.89 | 5 |
| 31B | | | 0.932 | 0.85 | 5 |
| 31C | | | 0.992 | 0.36 | 5 |
| 32A | 7.5 | 12.95 | 0.97 | 1.7 | less than 4 |
| 32B | | | 0.98 | 0.95 | |
| 32C | | | 0.97 | 1.1 | |
| 33A | 10 | 18.5 | 0.954 | 1.11 | less than 4, approx. 2 |
| 33B | | | 0.93 | 1.49 | |
| 33C | | | 0.94 | 1.64 | |

Examples 27 to 32 all had zero (unmeasurable) open porosity; Examples 33A, 33B and 33C. had values of 1.24%, 1.68% and 1.09%.

Table 4B gives details of the surface smoothness of the samples on which hardness and toughness measurements were carried out, and Table 4C. gives elastic modulus and the fracture strength under the three point loading condition.

The samples were potted in epoxy resin and then polished with 14 and 6 micron diamond paste to reach flatness. 3 Micron diamond paste was then used first on a nylon plate and then on a cloth and finally 1 micron diamond paste.

TABLE 4B

| Ex. | Vol % ZrO$_2$ | Wt % ZrO$_2$ | Polished Surface smoothness R$_a$ microns | H Hardness GPa | T Toughness MPa M$^{-0.5}$ |
|---|---|---|---|---|---|
| 27 | 0.18 | 0.34 | 0.07 | 8.4 | 4.5 |
| 28 | 1 | 1.85 | 0.04–0.06 | 9.3 | 4.2 |
| 29 | 2 | 3.7 | 0.07 | 9.4 | 3.6 |
| 30 | 3.5 | 6.475 | 0.08 | 9.8 | 2.9 |
| 31 | 5 | 9.25 | 0.09 | 9.8 | 3.4 |
| 32 | 7.5 | 12.95 | 0.095 | 9.7 | 3.1 |
| 33 | 10 | 18.5 | 0.14 | 8.4 | 4.4 |
| 1 | — | — | 0.09–0.11 | 7.9 | 2.8 |

TABLE 4C

| Ex. | Vol % ZrO$_2$ | Wt % ZrO$_2$ | YM GPa | Fracture strength under the three point loading condition sigma$_f$ MPa | | |
|---|---|---|---|---|---|---|
| 27 | 0.18 | 0.34 | 360 | 190[1] | sd[2] | 15 |
| 28 | 1 | 1.85 | 359 | 222 | sd | 30 |
| 29 | 2 | 3.7 | 356 | 214 | sd | 30 |
| 30 | 3.5 | 6.475 | 355 | 230 | sd | 23 |
| 31 | 5 | 9.25 | 357 | — | | |
| 32 | 7.5 | 12.95 | 348 | 167 | sd | 14 |
| 33 | 10 | 18.5 | 345 | — | | |
| 1 | — | — | 348 | 154 | sd | 28 |

Notes on Table 4C
[1] Average of 10 measurements.
[2] Standard deviation.

Fracture strength under the three point loading condition, signal$_f$, was measured in MPA (Mega Pascals) on a Houndsfield tensometer using square shouldered supports 13.5 mm apart, giving a span 1 of 13.5 mms for 15 mm square samples. The sample is loaded to produce a deflection of 0.2 mm/min. with a load cell of 5000 Newtons at 20% scale so that the full scale reading is 1000 Newtons. The load, in Newtons, F, applied is recorded on a digital readout which stops when the sample breaks, this peak reading, F, being used to calculate the cross break value, sigma$_f$, as herein defined from the following equation:

$$\text{sigma}_f = \frac{3Fl}{2bd^2} \qquad \text{eqt. (4)}$$

where $F$ is load in Newtons at break,
$d$ is sample thickness in mm,
$l$ is span between supports in mm, and
$b$ is the breadth of the sample in mm.

X ray diffraction analysis of the surface of the beryllia ceramic identified zirconium oxide as being present, using the (111) reflection which gives a peak for tetragonal and cubic forms superimposed at about 30.25° (2-theta (copper K )) and peaks at about 31.6° (2-theta) for the monoclinic (111) reflection and at about 28.4° (2-theta) for the monoclinic (111) reflection, and comparison with high angle 2-theta reflections which distinguishes tetragonal from cubic, reveals that a substantial proportion of the zirconium oxide is in the tetragonal crystalline form rather than either the cubic or monoclinic for the materials of examples 28, 29 and 30.

EXAMPLES 34 and 35

Figure 9A:
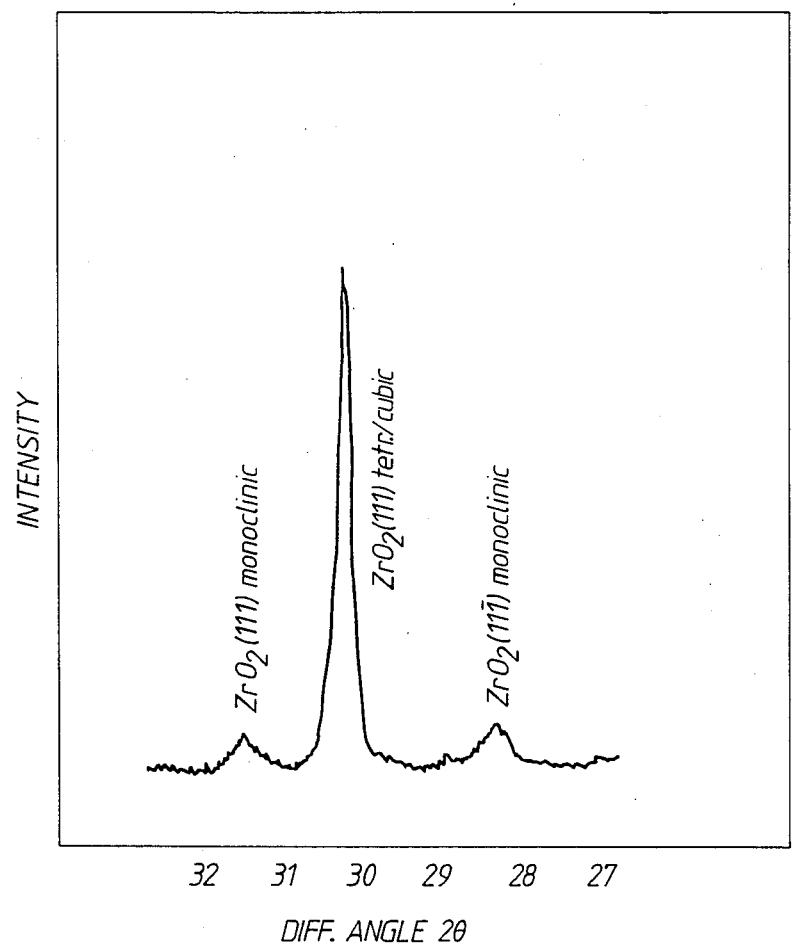
Figure 9B:
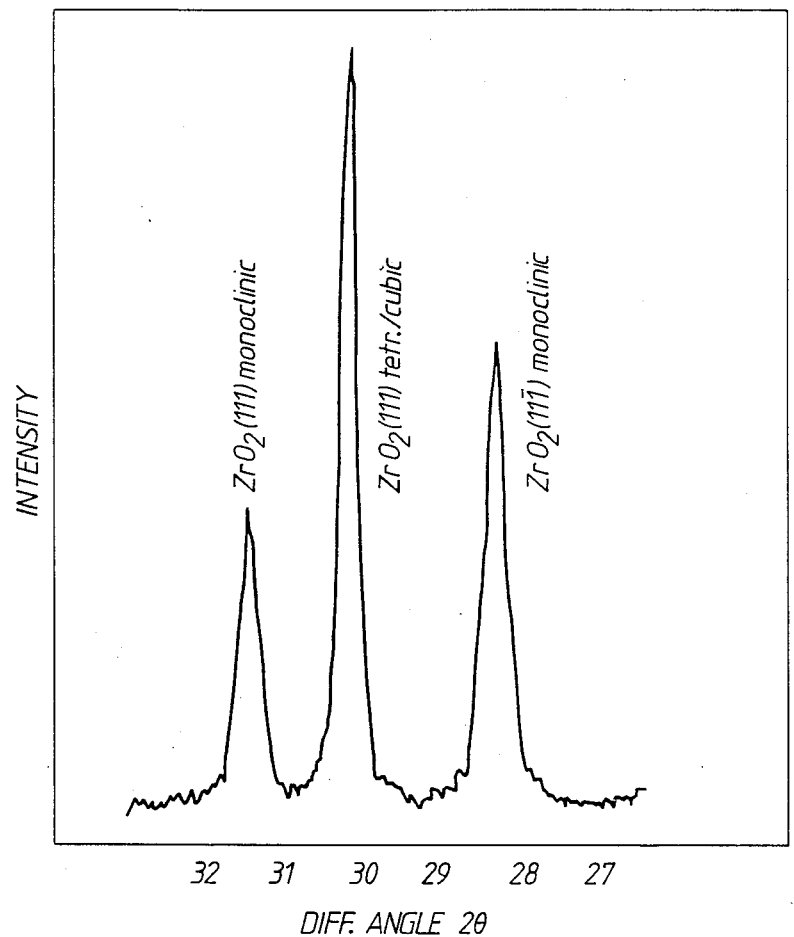
Figure 24:
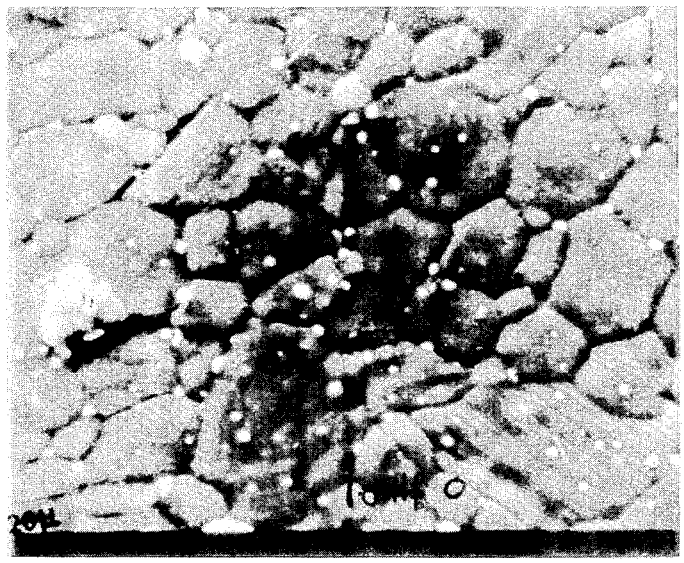

Examples 29 and 33 were repeated but at a sintering temperature of 1480° C. for 2 hours. FIG. 9A shows an X ray diffraction scan for the material of Example 34 (2% vol $ZrO_2$) and the scan indicates the zirconia to be predominantly tetragonal. The height of the monoclinic peak at 32 and 28.5° (2 theta) indicates the presence of no more than 10% monoclinic zirconia, namely 5.5%.

By contrast a similar scan (FIG. 9B) on the material of Example 35 (10 vol % $ZrO_2$) indicates a substantially higher amount of monoclinic zirconia to be present, in excess of 25%, namely 34%.

The presence of monoclinic zirconia as large particles will produce microcracks which can be expected to have a detrimental effect on certain properties of the final ceramic.

Figure 3B:
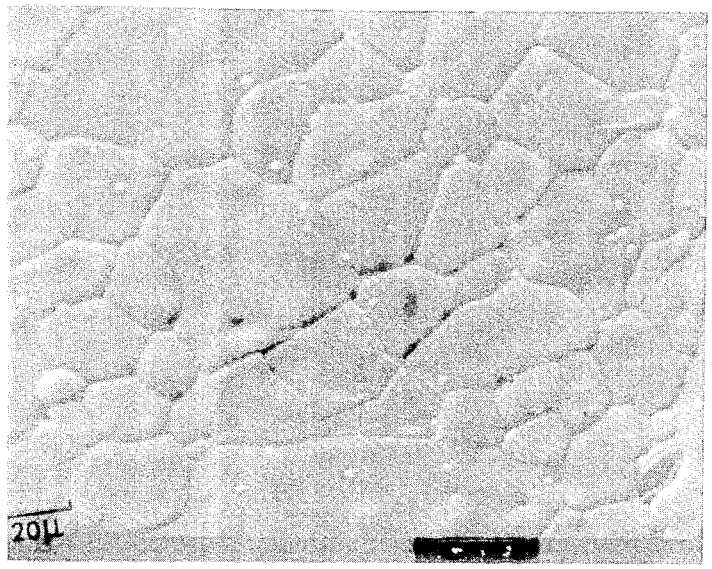
Figure 3C:
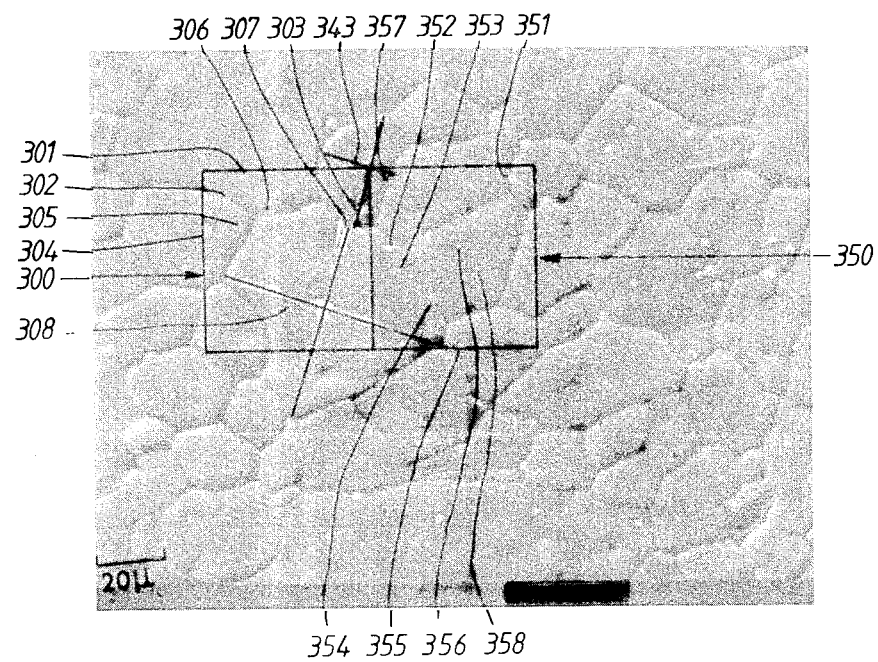
Figure 3D:
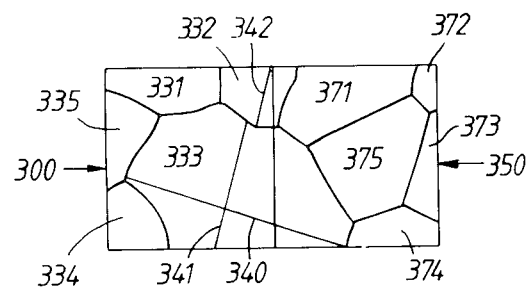
Figure 4B:
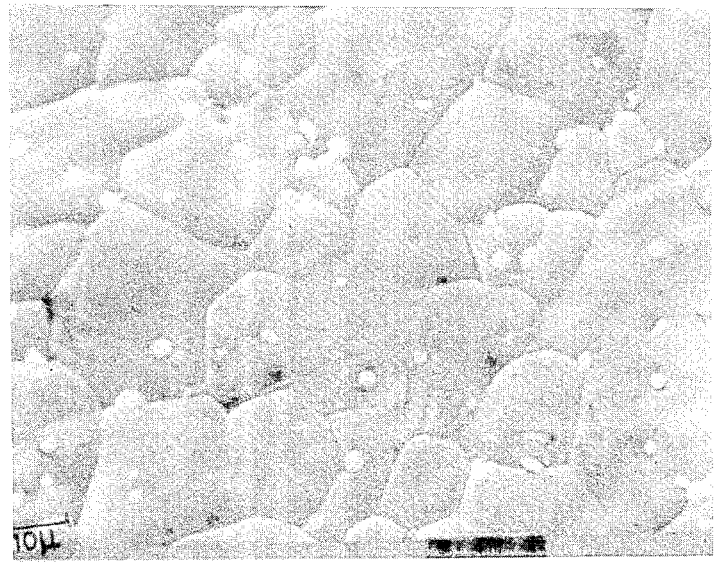
Figure 4C:
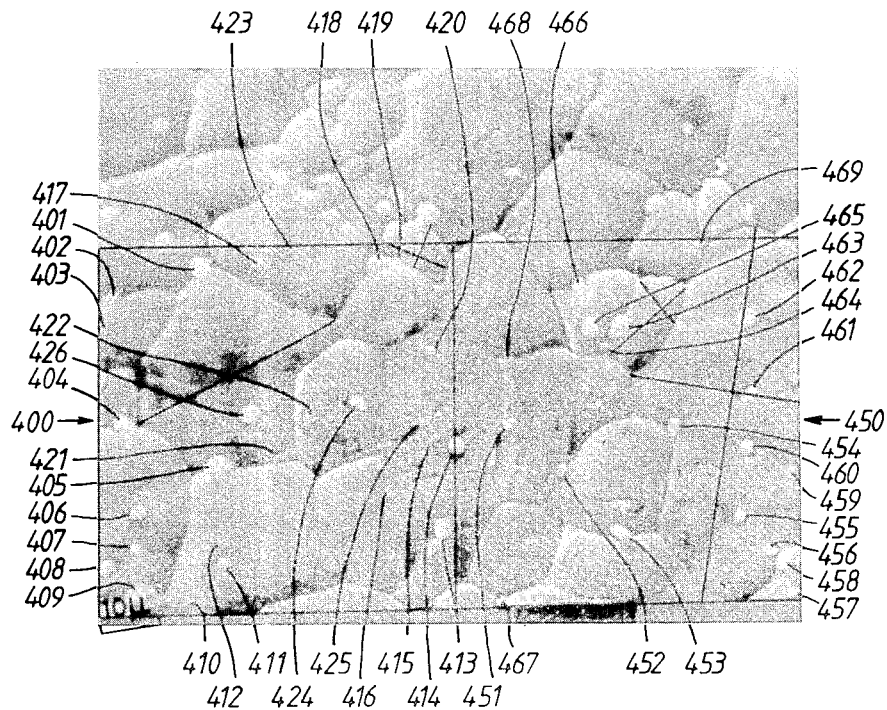
Figure 4D:
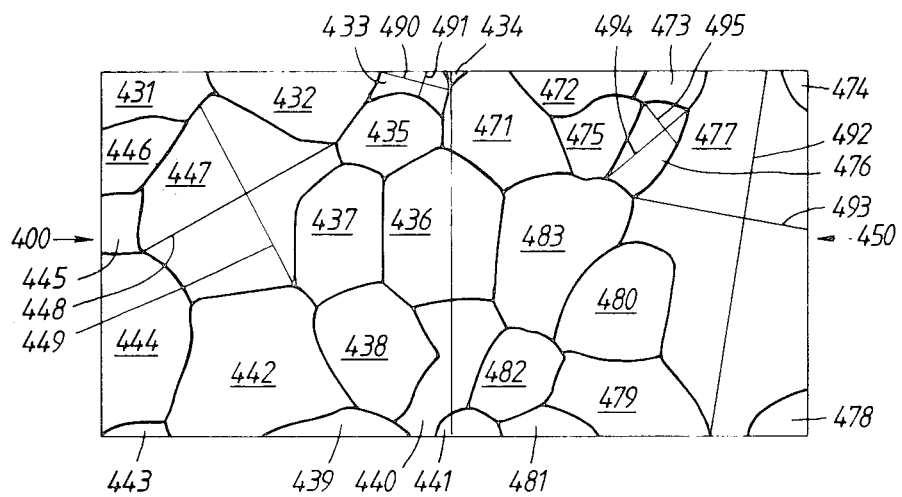
Figure 5C:
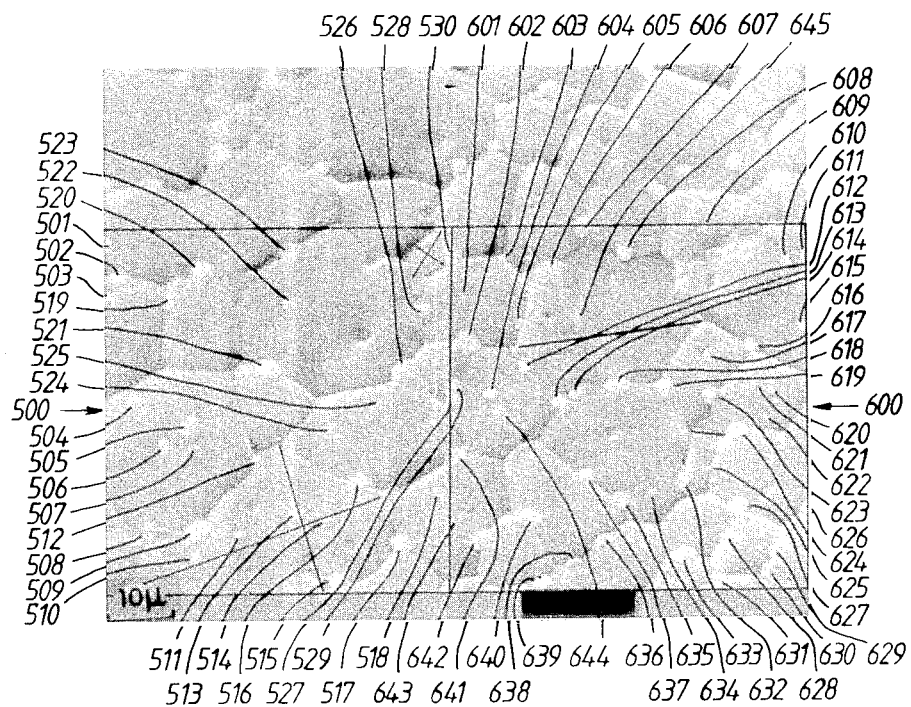

Referring now to the accompanying figures, FIGS. 3C, 4C and 5C show the analysis of A/B number ratios and A sizes for these figures and give an indication of the B sizes as well; FIGS. 3D, 4D and 5. 5D are sketches of regions of FIGS. 3C, 4C and 5C identifying the BeO grains visible therein.

For the A/B grain number ratio and A/B grain size ratio a square cut out having sides equivalent to 50 microns by 50 microns in the actual product is prepared and is superposed over the photograph. Two sampling areas contiguous to each other are taken at random and the values obtained are averaged.

The A particles are small and generally rounded having a long width WL (the longest dimension visible in the photograph) not greatly different to their short width WS. The short width is the widest point of the particle visible in the photograph in a direction perpendicular to the long width. Thus the A particles have a WL/WS ratio generally not greater than 3:1 and usually less than 2:1 and typically in the range 1:1 to 1.5:1. Energy dispersive X-ray analysis (EDAX) of these A particles reveals them to contain zirconium.

The A particles which are counted are those having a WL in the range 0.5 to 10 microns, typically the A grains have a WL in the range 1 to 5 or 1 to 4 microns.

The B grains apparent in the photomicrographs are the beryllium oxide grains and these have generally polygonal shapes as defined by the grain boundaries visible in the photomicrographs of the surface. The WL/WS ratio for the B grains has a wider range than for the A particles.

In general the WS values for B grains, BWS, is substantially greater than the WL values for the A particles, AWL. The BWS/AWL ratio is typically at least 2:1, 3:1 or 4:1 for the majority of the 8 grains.

Referring now to FIGS. 3C and 3D, the two contiguous sampling areas are labelled 300 and 350. FIG. 3C labels the A type particles ($ZrO_2$) of which there are eight namely 301–308 in sampling area 300 and eight namely 351–358 in sampling area 350. None of these A particles have a long width in the photograph AWL greater than 5 microns but all have a short width in the photograph AWS of not less than 0.5 micron.

FIG. 3D labels the B type grains (BeO) of which there are five namely 331–335 in sampling area 300 and five namely 371–375 in sampling area 350.

It should be noted that when an A particle or B grain is intersected by the edge of a sampling area it is counted as occurring within the sampling area, but that when it is intersected by the boundary between the two sampling areas it is only counted in one of the areas.

The longest long width BWL of a B grain falling within the sampling area 300 (or partially within it) is that of B grain 333 (which also falls in sampling area 350) and this is the length labelled 340 in FIG. 3D and is 3.9 cms long in FIG. 3C corresponding to about 68 microns, and this is $BWL_{max}$ for both sampling areas 300 and 350. This B grain 333 has a short width labelled 341 of 3.3 cms on FIG. 3C corresponding to about 57 microns.

The shortest short width BWS of a B grain falling within the sampling area 300 (or partially within it and wholly visible) is that of B grain 332 (which also falls in sampling area 350) and this is the length 343 (shown on FIG. 3C) which is perpendicular to the long width 342 (shown in FIG. 3D), and is 1.2 cms long on FIG. 3C corresponding to about 21 microns, and this is $BWS_{min}$ for both sampling areas 300 and 350.

Thus the $BWS_{min}/AWL_{max}$ ratio is 21:5 i.e. 4.2:1 or greater.

The average particle dimensions, APD(A), are $(AWL_{max}+AWS_{min})/2$ for the A particles, and average grain dimensions $AGD(8)=(BWL_{max}+BWS_{min})/2$ for the B grains, and for FIG. 3 (Example 27) are $APD(A) = (5+0.5)/2 = 2.75$ and $AGD(B) = (68+21)/2 = 44.5$. The ratio of AGD(B)/APD(A) for Example 28 is 44.5, 2.75 or about 16:1.

Referring now to FIGS. 4C and 4D, the two contiguous sampling areas are labelled 400 and 450. FIG. 4C labels the A type particles ($ZrO_2$) of which there are twenty-six namely 401–426 in sampling area 400 and nineteen namely 451–469 in sampling area 450. None of these A particles have a long width in the photograph AWL greater than 5 microns e.g. A particle 405 is about 5 microns long but all have a short width in the photograph AWS of not less than 0.5 micron.

FIG. 4D labels the B type grains (BeO) of which there are seventeen namely 431–447 in sampling area 400 and thirteen namely 471–483 in sampling area 450.

The A particle 414 is only counted in sampling area 400 and B grains 434, 440 and 441 only in sampling area 400 and B grain 371 only in sampling area 450.

The longest long width BWL of a B grain falling within the sampling area 400 (or partially within it) is that of B grain 447 and this is the length labelled 448 in FIG. 4D and is 3.8 cms long on FIG. 4C corresponding to about 38 microns, and this is $BWL_{max}$ for the sampling area 400. This B grain 447 has a short width labelled 449 of 3.4 cms on FIG. 4C corresponding to about 34 microns.

The shortest short width BWS of a B grain falling within the sampling area 400 (or partially within it and wholly visible) is that of B grain 433 and this is the length 491 (shown on FIG. 4C) which is perpendicular to the long width 490 (shown in FIG. 4D), and is 0.7 cms long on FIG. 4C corresponding to about 7 microns, and this is $BWS_{min}$ for the sampling area 400.

Thus the $BWS_{min}/AWL_{max}$ ratio is 7:5, i.e. 1.4:1 or greater for the sampling area 400.

Turning now to sampling area 450 the longest long width BWL of a B grain falling within the sampling area 450 (or partially within it) is that of B grain 477 and this is the length labelled 492 in FIG. 4D and is about 6.3 cms long on FIG. 4C corresponding to about 63 microns (it is in fact somewhat greater than this since it overlaps the edge of FIG. 4C), and this is the $BWL_{max}$ for the sampling area 450.

This B grain 477 has a short width labelled 493 in FIG. 4D of 3.0 cms on FIG. 4C corresponding to about 30 microns.

The shortest short width BWS of a B grain falling within the sampling area 450 (or partially within it) is that of 8 grain 476 and this is the length 495 (shown on FIG. 4D) which is perpendicular to the long width 494 (shown in FIG. 4D) and is 0.9 cms long on FIG. 4C corresponding to 9 microns, and this is the $BWS_{min}$ for the sampling area 450.

Thus the $BWS_{min}/AWL_{max}$ ratio is 9:5 i.e. 1.8:1 or greater for the sampling area 450.

The average particle dimensions, APD(A) $(AWL_{max}+AWS_{min})/2$ for the A particles for FIG. 4 (Example 28) for sampling area 400 is $(5+0.5)/2 = 2.75$, and for sampling area 450 is $(5+0.5)/2 = 2.75$, i.e. an average of 2.75.

For the B grains for the sampling area 400 AGD(B) is $(37+7)/2 = 22.5$, and for the sampling area 450 is $(63+9)/2 = 35.5$, i.e. an average of 29.

The ratio of AGD(B)/APD(A) for Example 29 is thus 29:2.75 or about 10:1.

Figure 5D:
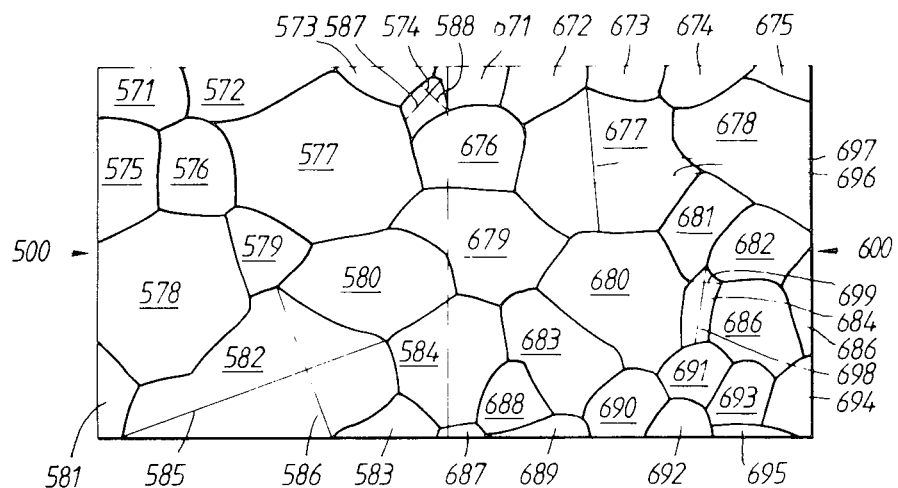

Referring now to FIGS. 5C and 5D, the two contiguous sampling areas are labelled 500 and 600. FIG. 5C labels the A type particles ($ZrO_2$) of which there are thirty, namely 501-530 in sampling area 500 and forty-five, namely 601-645 in sampling area 600. None of these A particles has a long width in the photograph AWL greater than 4 microns e.g. A particle 510 is about 4 microns long as is 602, but all have a short width in the photograph AWS of not less than 0.5 micron.

FIG. 5D labels the B type grains (BeO) of which there are fourteen, namely 571-584 in sampling area 500 and twenty-five, namely 671-695 in sampling area 600.

The A particles 528, 529 and 530 are only counted in sampling area 500 and B grains 580 and 584 only in sampling area 500 and B grains 676, 679 and 687 only in sampling area 600.

The longest width BWL of a B grain falling within the sampling area 500 (or partially within it) is that of B grain 582 and this is the length labelled 585 in FIG. 5D and is 4.9 cms long in FIG. 5C corresponding to about 39 microns, (it may in fact be somewhat greater than this since it overlaps the edge of FIG. 5C), and this is $BWL_{max}$ for the sampling area 500. This B grain 582 has a short width labelled 586 of 2.5 cms on FIG. 5C corresponding to about 20 microns.

The shortest short width BWS of a B grain falling within the sampling area 500 (or partially within it) is that of B grain 574 and this is the length 588 (shown in FIGS. 5C and 5D) which is perpendicular to the long width 587 (shown on FIG. 5D), and is 0.6 cms long on FIG. 5C corresponding to about 5 microns, and this is $BWS_{min}$ for the sampling area 500.

Thus the $BWS_{min}/AWL_{max}$ ratio is 5,4, i.e. 1.25:1 or greater for the sampling area 500.

Turning now to sampling area 600 the longest long width BWL of a B grain falling within the sampling area 600 (or partially within it) is that of B grain 677 and this is the length labelled 696 in FIG. 5D and is about 3.2 cms long on FIG. 5C corresponding to about 26 microns and this is the $BWL_{max}$ for the sampling area 600.

This B grain 677 has a short width labelled 697 in FIG. 5D of 2.3 cms on FIG. 5C corresponding to about 18 microns.

The shortest short width BWS of a B grain falling within the sampling area 600 (or partially within it and wholly visible) is that of B grain 684 and this is the length 699 (shown on FIG. 5D) which is perpendicular to the long width 698 (shown in FIG. 5D) and is 0.5 cms long on FIG. 5C corresponding to 4 microns, and this is the $BWS_{min}$ for the sampling area 600.

Thus the $BWS_{min}/AWL_{max}$ ratio is 4:4 i.e. 1:1 or greater for the sampling area 600.

The average particle dimensions, AGD(A) $(AWL_{max}+AWS_{min})/2$ for the A particles for FIG. 5 (Example 29) for sampling area 500 is $(4+0.5)/2 = 2.25$, and for sampling area 600 is $(4+0.5)/2 = 2.25$, i.e. an average of 2.25.

For the B grains for the sampling area 500 AGD(B) is $(39+5)/2 = 22$, and for the sampling area 600 is $(18+4)/2 = 11$, i.e. an average of 16.5.

The ratio of AGD(B)/APD(A) for Example 30 is thus 16.5:2.25 or about 7:1.

Thus more broadly the ratio of AGD for the B grains to APD for the A particles is at least 2:1 or 3:1 or 4:1, and preferably in the range 20:1 to 5:1, more particularly 16:1 to 7:1, especially 12:1 to 8:1.

According to another aspect of the present invention a beryllia based ceramic containing a minor proportion of zirconium oxide and magnesium oxide is characterised by an as-fired surface which exhibits rounded compact zirconium containing particles, A particles the majority of which is in the tetragonal form as revealed by X ray diffraction analysis, and larger beryllia grains, B grains, typically having polygonal shapes as defined by the grain boundaries visible in the surface, the majority of the said A particles being located at the boundaries of the B grains, the ratio of the average grain dimensions (as herein defined) of the B grains to the average particle dimensions (as herein defined) of the A particles being at least 2:1, and particularly in the range 12:1 to 8:1.

The average A particle number (APNA) is the number of A particles in two contiguous 50 micron by 50 micron sampling areas and the average B grain number (AGNB) is the number of B grains in the same two samples areas.

APNA/AGNB is $(8+8)/2:(5+5)/2$, i.e. 8:5 or 1.6:1 for Example 28; APNA/AGNB is $(26+19)/2:(17+13)/2$ i.e. 22.5:15 or 1.5:1 for Example 29; and the APNA/AGNB is $(30+45)/2:(14+25)/2$ i.e. 37.5:19.5 or 1.9:1 for Example 30.

The invention thus extends to a beryllia based ceramic containing a minor proportion of zirconium oxide and magnesium oxide characterised by an as fired surface which exhibits rounded compact zirconium containing particles, A particles and larger beryllia grains, B grains, typically having polygonal shapes as defined by the grain boundaries visible in the surface, the ratio of the average particle number (as herein defined) of the A particles to the average grain number (as herein defined) B grains being at least 1.5:1 and particularly in the range 1.5:1 to 2:1.

Whilst the invention is not dependent on the accuracy or otherwise of any particular theory it is suggested that the defined rare earth oxide such as $ZrO_2$ may operate to prevent grain growth, when firing of the green composition is commenced, for long enough for the voids at the grain boundaries largely or substantially completely to sinter out.

The invention also extends to a green ceramic composition comprising beryllium oxide, substantially free of silicate forming ingredients, containing an amount of defined rare earth oxide or oxides such that the sintering temperature of the composition is below 1550° C. and such that on sintering of the said composition a sintered ceramic material is obtained which has a density in excess of 98% of the theoretical density of the fired ceramic, and preferably 98.5 or 99 or 99.5% or higher.

EXAMPLES 36 to 41

The procedure of Example 18 was repeated using zirconium nitrate in an amount to provide 5 wt % of $ZrO_2$ and amounts of magnesium nitrate such as to produce varying weight % of $MgO_2$ as given in Table 5A below. A pressure of 12 tons/sq. inch (27000 psi) (185.4 MPa) was used to press the green composition into discs before firing as described for Examples 27 to 33.

TABLE 5A

| Ex. | Wt % $ZrO_2$ | Wt. % $MgO_2$ | Density | Theoretical density | % Theoretical density |
| --- | --- | --- | --- | --- | --- |
| 36 | 5 | 0.1 | 3.05 | 3.084 | 98.9 |
| 37 | 5 | 0.2 | 3.05 | 3.084 | 98.9 |
| 38 | 5 | 0.3 | 3.05 | 3.084 | 98.9 |
| 39 | 5 | 0.5 | 3.052 | 3.085 | 98.9 |
| 40 | 5 | 1.0 | 3.054 | 3.087 | 98.9 |

Examples 36, 37 and 38 all gave an as-fired surface similar to that of Examples 28 to 30 as shown in FIGS. 38, 4B and 5B. Examples 39 and 40 had rougher as fired surfaces.

Table 5B identifies the relevant figures of the drawings.

TABLE 5B

| Ex. | FIG. | Scale | Comments |
| --- | --- | --- | --- |
| 36 | 10 | 20 mu[1] | As fired surface similar to Exs. 28 to 30 |
| 37 | 11 | 20 mu | As fired surface similar to Ex. 28–30 |
| 38 | 12 | 20 mu | As fired surface similar to Ex. 28–30 |
| 39 | 13 | 10 mu | As fired surface rougher than Exs. 36–38 |
| 40 | 14 | 20 mu | As fired surface rougher than Exs. 36–38 |

Note on Table 5B
[1]mu = microns

The best results as concerns surface smoothness are given by Examples 36 to 38 i.e at amounts of magnesium oxide below 0.5% by weight.

EXAMPLES 41 to 46

The procedure of Example 36 to 40 was repeated using zirconium nitrate in an amount to provide wt % of $ZrO_2$ and amounts of magnesium nitrate such as to produce varying weight % of $MgO_2$ as given in Table 6A below. A pressure of 27000 psi (185.4 MPa) was used to press the green composition into discs before firing as described for Examples 27 to 33.

TABLE 6A

| Ex. | Wt % $ZrO_2$ | Wt. % MgO | Density | Theoretical density | % Theoretical density |
| --- | --- | --- | --- | --- | --- |
| 41 | 10 | 0.1 | 3.11 | 3.153 | 98.6 |
| 42 | 10 | 0.2 | 3.12 | 3.153 | 98.6 |
| 43 | 10 | 0.3 | 3.11 | 3.154 | 98.6 |
| 44 | 10 | 0.5 | 3.12 | 3.154 | 98.9 |
| 45 | 10 | 1.0 | 3.11 | 3.156 | 98.5 |

10% by weight $ZrO_2$ is 0.11 mole %.

Examples 41 and 42 gave as-fired surfaces similar to those of Examples 28 to 30 though the surface of Example was rougher than that of Example 41.

Table 6B identifies the relevant figures of the drawings.

TABLE 6B

| Ex. | FIG. | Scale | Comments |
| --- | --- | --- | --- |
| 41 | 15 | 10 mu | As fired surface similar to Exs. 28 to 30 |
| 42 | 16 | 10 mu | Rougher than Ex. 41. As fired surface similar to Exs. 28–30. |

EXAMPLES 47 to 53

The procedure of Examples 36 to 40 was repeated using zirconium nitrate in an amount to provide 1.85 wt % of $ZrO_2$ and amounts of magnesium nitrate such as to produce varying weight % of $MgO_2$ as given in Table 8 A below. A pressure of 18 tons/sq. inch (278 MPa) was used to press the green composition into discs before firing as described for Examples 27 to 33.

TABLE 7A

| Ex. | Wt % $ZrO_2$ | Wt. % $MgO_2$ | Density | Theoretical density | % Theoretical density |
| --- | --- | --- | --- | --- | --- |
| 47 | 1.85 | 0.05 | 2.99 | 3.036 | 98.5 |
| 48 | 1.85 | 0.1 | 2.99 | 3.0385 | 98.4 |
| 49 | 1.85 | 0.3 | 3.00 | 3.0395 | 98.7 |
| 50 | 1.85 | 0.4 | 3.00 | 3.0400 | 98.7 |
| 51 | 1.85 | 0.5 | 2.99 | 3.0404 | 98.4 |
| 52 | 1.85 | 1.0 | 2.99 | 3.0428 | 98.4 |
| 53 | 1.85 | 2.0 | 3.00 | 3.0477 | 98.4 |

Examples 47 to 49 all gave an as-fired surface similar to that of Examples 28 to 30, the as-fired surface of Example 50 was still quite smooth but the white grains apparent in FIGS. 3B, 4B and 5B were no longer apparent, different rougher looking grains were apparent.

Table 7B identifies the relevant figures of the drawings.

TABLE 7B

| Ex. | FIG. | Scale | Comments |
| --- | --- | --- | --- |
| 47 | 17 | 20 mu | As fired surface similar to Exs. 28 to 30 |
| 48 | 18 | 20 mu | As fired surface similar to Exs. 28 to 30 |
| 49 | 19 | 20 mu | As fired surface similar to Exs. 28 to 30 |
| 50 | 20 | 20 mu | As fired surface still quite smooth but white grains apparent in FIGS. 28 to 30 no longer present - different sort of grains present on surface. |
| 51 | 21 | 20 mu | As fired surface similar to FIG. 23B but grains more frequent and some rough particles. |
| 52 | 22 | 20 mu | As fired surface similar to FIGS. 20B and 21B but grains more frequent and showing a tendency to occur in clusters. |

Example 51 had an as-fired surface similar to that of Example 50 but the grains were more frequent and there were also some rough particles. Example 52 had an as-fired surface similar to that of Examples 50 and 51 but the grains were more frequent than in Example 51 and showed a tendency to occur in clusters.

The best results as concerns as fired surface smoothness are given by Examples 47 to 50 i.e. at amounts of magnesium oxide below 0.5% by weight. However Example 50 has a different appearance and a somewhat less smooth appearance, Examples 47 to 49 are at amounts of magnesium oxide below 0.4% by weight.

Examples 51 and 52 have a marked increase in surface irregularities.

EXAMPLES 54 to 58

The procedure of Example 18 was repeated but using hafnium oxide in an amount to provide varying wt % of $HfO_2$ (MW 210.44 density 9.68 g/cc) as given in Table 9A below and 0.2 weight % of MgO. The hafnium oxide was reactor grade material supplied by Johnson Matthey Chemicals Ltd. and contained approximately 1.5% $ZrO_2$. The weight of $HfO_2$ quoted in Table 9A is calculated on the assumption that the hafnium was 100% pure. A pressure of 27000 psi (185.4 MPa) was used to press the green composition into discs before firing as described for Examples 27 to 33.

The discs were fired with a firing sequence of 200° C. temperature increase per hour to 1200° C., a 4 hr. dwell at 1200° C. and then raised to 1480° C. and held for 8 hours and then allowed to cool to room temperature over about 6 hours.

TABLE 8A

| Ex. | Vol % $HfO_2$ | Wt % $HfO_2$ | Wt. % MgO | Density | Theoretical density | % Theoretical density |
|---|---|---|---|---|---|---|
| 54 | 1 | 3.15 | 0.2 | 3.04 | 3.0755 | 98.9 |
| 55 | 1.5 | 4.67 | 0.2 | 3.08 | 3.106 | 99.2 |
| 56 | 2 | 6.16 | 0.2 | 3.09 | 3.136 | 98.5 |
| 57 | 3 | 9.05 | 0.2 | 3.16 | 3.199 | 98.8 |
| 58 | 5 | 14.48 | 0.2 | 3.26 | 3.298 | 98.95 |

14.48% by weight $HfO_2$ is 0.069 mole %.

The grain size (measured as in Example 1) decreased from 13 microns for Example 54 via 10 (Ex. 55), 9 (Ex. 56), 8(Ex. 57) to 7 microns for Example 58.

Table 8B identifies the relevant figures of the drawings.

TABLE 8B

| Ex. | FIG. | Scale | Comments |
|---|---|---|---|
| 54 | 23 | 20 mu | As fired surface |
| 55 | 24 | 20 mu | As fired surface |
| 56 | 25 | 20 mu | As fired surface |
| 57 | 26 | 10 mu | As fired surface |
| 58 | 27 | 20 mu | As fired surface |

EXAMPLES 59 to 63

Examples 54 to 58 were repeated but heating to 1530° C. instead of 1480° C. in the firing process. This produced in increase in grain size without a change in density, the grain size decreasing from 20.25 in Example 59 via 12.5 (Ex. 60), 13(Ex. 61), 10(Ex. 62) to 9 for Example 63.

Table 9 identifies the relevant figures of the drawings.

TABLE 9

| Ex. | FIG. | Scale | Comments |
|---|---|---|---|
| 59 | 28 | 40 mu | As fired surface |
| 60 | 29 | 40 mu | As fired surface |
| 61 | 30 | 40 mu | As fired surface |
| 63 | 31 | 40 mu | As fired surface |

EXAMPLES 64 to 66

The procedure of Examples 54 to 58 is repeated using $Ce_2O_3$ (MW 328.24 density 6.86 g/cc) instead of $HfO_2$ except that the firing is done with a different heating sequence.

Thus the green discs are heated from 24° C. at 200° C/hour to 1480° C., held at 1480° C. for 8 hours and then allowed to cool to 25° C. over 3 hours.

Table 10A below gives the amounts of ingredients, density, % of theoretical density and grain size (G.S.)

TABLE 10A

| Ex. | $Ce_2O_3$ Vol % | $Ce_2O_3$ Wt % | MgO Wt % | Density | % of theoretical density | G.S.[1] (microns) |
|---|---|---|---|---|---|---|
| 64 | 1 | 2.25 | 0.2 | 3.001 | 98.8 | 13–15 |
| 65 | 5 | 10.71 | 0.2 | 3.140 | 98.7 | 7 |
| 66 | 5 | 10.71 | 0 | 3.004 | 94.4 | less than 4 |

Note on Table 10A
[1]G.S. = grain size, measured as described for Example 1.
10.7% by weight of $Ce_2O_3$ is 0.033 mole %.

Table 10B identifies the relevant figures of the drawings.

TABLE 10B

| Ex. | FIG. | Scale | Comments |
|---|---|---|---|
| 64 | 32 | 40 mu | As fired surface similar to Exs. 28–30 |
| 65 | 33 | 20 mu | As fired surface rougher than FIG. 32 |
| 66 | 34 | 10 mu | As fired surface very rough |

The fired ceramic products of Examples 64 and 65 exhibit a blue colour while that of Example 66 is a creamy white colour.

EXAMPLES 67 and 68

The procedure of Example 18 was repeated but using ytterbium oxide in an amount to provide varying wt % of $Yb_2O_3$ (MW 394.08 density 9.17 g/cc) as given in Table 12A below and 0.2 weight % of MgO. The ytterbium oxide was reactor grade material supplied by Johnson Matthey and contained at least 99% $Yb_2O_3$.

The weight of $Yb_2O_3$ quoted in TAble 11A is calculated on the assumption that the ytterbia was 100% pure. A pressure of 27000 psi (185.4 MPa) was firing as described for Examples 27 to 33.

The discs were fired with a firing sequence of 200° C. temperature increase per hour to 1200° C., a 4 hr. dwell at 1200° C. and then raised to 1480° C., and held for 8 hours and then allowed to cool to room temperature over about 6 hours.

TABLE 11A

| Ex. | Vol % $Yb_2O_3$ | Wt % $Yb_2O_3$ | Wt. % MgO | Density | Theoretical density | % Theoretical density |
|---|---|---|---|---|---|---|
| 67 | 1 | 2.99 | 0.2 | 3.022 | 3.071 | 98.4 |
| 68 | 5 | 13.82 | 0.2 | 3.21 | 3.278 | 98.1 |

The grain size of the as-fired surface of Example 67 (as measured in Example 1) was 9 microns, that of Example 68 was 25 microns but grain sizes ranged from 10 to 100 microns.

13.82% by weight of $Yb_2O_3$ is 0.035 mole %.

Table 11B identifies the relevant figures of the drawings.

TABLE 11B

| Ex. | FIG. | Scale | Comments |
|-----|------|-------|----------|
| 67 | 35 | 20 mu | As fired surface, small amount of very fine sized surface particles in addition to a few of the particles present in FIGS. 3B, 4B, 5B and 6B, fewer than FIG. 3B. |
| 68 | 36 | 20 mu | As fired surface, more particles like those present in FIG. 3B but still fewer than in that FIG.; marked amount of fine sized surface particles of type seen in FIG. 35. |

EXAMPLE 69

200 g UOX BeO (as used in Example 1) was mixed with 400 of a mixture of $MgNO_3$ and zirconium nitrate such as to give 0.2% by wt. MgO and 1.85% by wt. $ZrO_2$ (on a dry weight basis after calcining). The mixture was ground in a VIBRA MILL for 3 hours. The mixture was then spray dried to less than 0.5% $H_2O$ content with gentle heating (approx. 80° C.). The spray dried mixture was collected and sized in a cyclone and the fines all having ultimate particle sizes less than 3 microns were collected and calcined at 400° C. for 6 hours to convert the nitrates to oxides, resulting in a base mixture of 0.2% MgO, 1.85% $ZrO_2$ balance BeO.

40 parts by weight of silicon carbide of ultrafine grade which has all particles less than 3 microns was mixed with 60 parts by weight of the said base mixture.

This BeO/SiC mixture was ground in the VIBRA MILL with $ZrO_2$ grinding balls in water for 2 hours and 0.5% of wax binder (MOBILCER) added as a 50% aqueous emulsion.

The ground mixture had no particles in excess of 3 microns in size. 200 grams of this ground 60/40 BeO/SiC mixture was placed in a carbon susceptor and pressed at 1500° C. to give a disc having a density of 2.6 g/cc.

When this was repeated at 1750–1790° C. the resulting disc had a density of 3.08 g/cc (measured by water displacement) which is very close to the theoretical maximum density.

The carbon susceptor is constructed as follows. It is a carbon cylinder 7" (17.8 cms) in diameter 9" (22.9 cms) long with a 2" (5 cms) axial bore passing through it. It has a radial hole penetrating ¼" (6.4 mms) inwardly from its circumference, this hole being occupied by a hollow alumina tube.

The temperature readings quoted above are measurements taken using a pyrometer focused on the carbon surface visible down this tube i.e. ¼" radially into the carbon cylinder.

The heating is achieved by an RF induction coil in the form of a water cooled tube wound around the carbon cylinder and operated at 10000 cycles/second. The assembly is thermally insulated by a layer of aluminia 2 inches (5 cms) thick surrounding and enclosing the outer surface of the carbon cylinder and the RF coil.

The bore contains two close fitting carbon pistons located in a hydraulic press so that a maximum pressure of up to 1 ton per square inch (15.45 MPa) can be applied.

Hot pressing is achieved by activating the induction coil to achieve the stated temperature and then applying pressure until movement of the piston stops. At this point a pressure of about 1 ton per square inch (15.45 MPa) has been applied.

The properties of the disc were measured after grinding the top and bottom faces to remove traces of adhered carbon.

The material could be drilled with a 1 cm diameter hole to produce a core though it was hard and tough, the diamond drill bouncing and screaming its way through.

The core was polished as described in connection with Examples 27 to 33 for microscopic examination achieving a polish of 1 microinch (0.025 microns) measured by the Surfcom technique described for Example 1.

Scanning electron photomicrographs were taken and inspection of a fracture surface through the material revealed the grain size to be about 3 microns.

Table 13 below gives details of certain physical properties of this material.

TABLE 12

| % open porosity | zero |
|---|---|
| Hardness[3] | 15 GPa |
| Toughness[3] | 4.5 MPa m$^{0.5}$ |
| Elastic modulus[1] | 400 GPa |
| Polished surface smoothness[1] microns | 0.025 |
| Fracture strength[2] under the three point loading condition sigma$_f$ MPa | 580 MPa |

Note on Table 13
[1] measured as described for Example 1.
[2] measured as described for Examples 27-33
[3] measured as described for Example 7 and Examples 27-33

The presence of silicon carbide in the beryllium oxide ceramic matrix of the present invention can result in a composition having lossy dielectric properties.

The proportions of BeO matrix and conducting silicon carbide (or other microwave absorbing ceramic) vary to provide a range of dielectric properties.

Microwave attenuators are taught in U.S. Pat. No. 3,538,205 to require from approximately 1% to 35% by weight of conducting granules or particles, and microwave loads to require conducting granules or particles in greater amounts up to about 80%. U.S. Pat. No. 3,538,205 thus teaches that 1 to 80% of the conducting material may be dispersed through the matrix. U.S. Pat. No. 3,538,205 emphasises the importance of achieving even distribution of the conducting particles through the matrix so that the particles are separated and surrounded by the matrix. If this is not achieved the composite will tend to act as a microwave conductor and reflect rather than absorb microwave energy.

U.S. Pat. No. 3,538,205 teaches a magnesium oxide based matrix. Beryllium oxide has advantages over magnesium oxide including improved heat dissipation. The present invention, using defined rare earths and MgO in combination, enables very high density materials to be achieved.

EXAMPLES 70 and 71

These examples are comparison examples and show the effect of using 0.5% by weight MgO without the presence of a defined rare earth (Example 70) and the effect of using 3.0% by weight of $ZrO_2$ without the presence of MgO (Example 71).

Both examples use the procedure of Example 18 but are sintered at 1480° C. for 8 hours being raised to that temperature at a rate of 150° C/hour. FIG. 37 shows the as-fired surface of Example 70, and demonstrates the surface roughening and very variable grain size. FIG. 38 shows the as-fired surface of Example 71, and demonstrates the rough surface and very small grain size.

Table 13 gives the values of certain physical properties of the as-fired products.

TABLE 13

| Example | 70 | 71 |
|---|---|---|
| Open porosity | 0.00% | 5.69% |
| Closed porosity | 3.22% | 4.14% |
| % of theoretical density | 96.78% | 90.17% |
| Densification parameter | 0.93 | 0.78 |
| Grain size | 20 to 150 micron | less than 4 micron |
| Sigma$_f^1$ | 127$^2$ MPa | 156 MPa |
| Standard deviation | 19 | 49 |

Note on Table 13
[1]Sigma$_f$ is fracture strength under the three point loading condition and the values given were measured by the method described for Examples 27 to 33.
[2]Ten samples were measured and the value quoted for sigma$_f$ is the mean, the standard deviation of the mean is also quoted.

It will be recalled that Examples 28 and 29 which both use 0.2% MgO and 1.85 and 3.7% by weight ZrO$_2$ respectively exhibit sigma$_f$ values of 222 (standard deviation 30) and 214 (standard deviation 30) respectively (see Table 4C) and densification parameters of 0.98 and 0.985, % closed porosities of 0.75% and 0.66% and grain sizes of 10 and 8 to 10 microns respectively.

EXAMPLE 72

The procedure of Example 18 was repeated but using 2.0% by weight thorium oxide and 0.2% by weight MgO. A pressure of 185.4 MPa was used to press the green composition before firing.

The discs were fired with the firing sequence of Examples 54 to 58.

The as-fired surface of the product is shown in FIG. 39. The product had zero open porosity, a % theoretical density of 98% and a grain size of 15–40 microns.

EXAMPLE 73

When Example 72 was repeated using 1% by weight yttrium oxide and 0.2% by weight MgO a material having a % theoretical density of 98% was produced with a grain size of 15 to 35 microns.

We claim:

1. A ceramic article having a density of at least 98% of its theoretical density and a Young's modulus (E) of at least 350 GPa, made from a mixture consisting essentially of on a dry weight basis magnesium oxide in an amount from 0.01% to 2% by weight, a defined oxide in an amount from 1% to 9.5% by weight, balance beryllium oxide, the defined oxide being zirconium oxide, hafnium oxide, cerium oxide, yttrium oxide, ytterbium oxide, or thorium oxide.

2. A fired ceramic made by firing a mixture consisting essentially of on a dry weight basis 0.01 to 0.49% by weight magnesium oxide, 1.0 to 9.5% by weight defined oxide less than 0.05% by weight silicon dioxide or silicon compounds, balance beryllium oxide trace, silicon compounds, wherein the defined oxide is an oxide of zirconium, hafnium, cerium, yttrium, ytterbium, or thorium, or a mixture thereof, the fired ceramic having a density of at least 98% of its theoretical density and a Young's modulus (E) of at least 350 GPa.

3. A fired ceramic as claimed in claim 1 in which the amount of magnesium oxide is in the range of 0.01 to 0.5% by weight.

4. A fired ceramic as claimed in claim 1, in which the amount of defined rare earth oxide is in the range 1.7 to 7.0% by weight.

5. A fired ceramic as claimed in claim 1 or 2 in which the a of magnesium oxide is in the range 0.1 to 0.3% by weight.

6. A fired ceramic made by firing a mixture consisting essentially of on a dry weight basis 0.01 to 0.49% by weight magnesium oxide, 1.0 to 9.5% by weight defined oxide, less than 0.05% by weight silicon dioxide or silicon compounds, balance beryllium oxide, oxide is an oxide of zirconium, hafnium, cerium, yttrium, ytterbium, or thorium, or a mixture thereof, the fired ceramic having a density of at least 98% of its theoretical density, a Young's modulus (E) of at least 350 GPa, and a surface smoothness as fired of 10 microinches or less.

7. A fired ceramic made by firing a mixture consisting essentially of on a dry weight basis 0.01 to 0.49% by weight magnesium oxide, 1.0 to 9.5% by weight defined oxide, less than 0.05% by weight silicon dioxide or silicon compounds, balance beryllium oxide wherein the defined oxide is an oxide of zirconium, hafnium, cerium, yttrium, ytterbium, or thorium, or a mixture thereof, the fired ceramic having a density of at least 98% of its theoretical density, and a Young's modulus (E) of at least 350 GPA, and wherein said ceramic article has improved hardness and fracture strength (sigma$_f$).

* * * * *